US010587985B2

(12) United States Patent
Shaw et al.

(10) Patent No.: US 10,587,985 B2
(45) Date of Patent: Mar. 10, 2020

(54) SMART MACHINE TO MACHINE BEHAVIOR TRACKING

(71) Applicant: AT&T Intellectual Property I, L.P., Atlanta, GA (US)

(72) Inventors: Venson M. Shaw, Kirkland, WA (US); Jin He, Fremont, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 15/966,863

(22) Filed: Apr. 30, 2018

(65) Prior Publication Data

US 2018/0249285 A1  Aug. 30, 2018

Related U.S. Application Data

(63) Continuation of application No. 14/548,935, filed on Nov. 20, 2014, now Pat. No. 9,961,486.

(51) Int. Cl.
| | | |
|---|---|---|
| *H04W 4/029* | (2018.01) | |
| *H04W 4/021* | (2018.01) | |
| *H04W 4/80* | (2018.01) | |
| *H04W 4/33* | (2018.01) | |
| *H04W 4/02* | (2018.01) | |

(52) U.S. Cl.
CPC ........... *H04W 4/029* (2018.02); *H04W 4/021* (2013.01); *H04W 4/33* (2018.02); *H04W 4/80* (2018.02); *H04W 4/023* (2013.01)

(58) Field of Classification Search
None
See application file for complete search history.

(56) References Cited

U.S. PATENT DOCUMENTS

| | | |
|---|---|---|
| 5,535,431 A | 7/1996 | Grube et al. |
| 6,032,127 A | 2/2000 | Schkolnick et al. |
| 6,119,935 A | 9/2000 | Jelen et al. |
| (Continued) | | |

FOREIGN PATENT DOCUMENTS

| | | |
|---|---|---|
| AU | 2004/222924 A1 | 10/2004 |
| CA | 2824784 A1 | 7/2011 |
| (Continued) | | |

OTHER PUBLICATIONS

Fincher, Jonathan, "Kinect grocery cart follows shoppers around the store," Good Thinking—gizmag, Mar. 5, 2012. http://www.gizmag.com/kinect-grocery-cart/21714/ Discloses Bluetooth device mounted on shopping carts.

(Continued)

*Primary Examiner* — Vladimir Magloire
*Assistant Examiner* — Donald H B Braswell
(74) *Attorney, Agent, or Firm* — BakerHostetler

(57) ABSTRACT

Smart M2M devices may be utilized to discover, generate, develop, and use customer behavior information. Security, marketing, and sales may be made through the use of short-range communication mechanisms, and customer behavior information may be gathered while providing devices with product information and other content. In an example configuration, smart M2M devices may determine the location of a device in a venue and compare it to historical location information associated with the device to determine whether authentication should be requested.

20 Claims, 15 Drawing Sheets

(56) References Cited

U.S. PATENT DOCUMENTS

| | | |
|---|---|---|
| 6,659,344 B2 | 12/2003 | Otto et al. |
| 7,295,132 B2 | 11/2007 | Steiner |
| 7,309,009 B2 | 12/2007 | Singer-Harter |
| 7,487,913 B2 | 2/2009 | Adema et al. |
| 7,660,747 B2 | 2/2010 | Brice et al. |
| 7,780,081 B1 | 8/2010 | Liang |
| 7,782,194 B2 | 8/2010 | Stawar et al. |
| 7,848,964 B2 | 12/2010 | Bonner et al. |
| 8,050,984 B2 | 11/2011 | Bonner et al. |
| 8,289,129 B2 | 10/2012 | Bauchot et al. |
| 8,350,758 B1 | 1/2013 | Parvizi et al. |
| 8,362,877 B2 | 1/2013 | Bauchot et al. |
| 8,412,590 B2 | 4/2013 | Elliott |
| 8,600,828 B2 | 12/2013 | Bonner et al. |
| 8,626,200 B2 | 1/2014 | Shaw et al. |
| 2002/0170961 A1 | 11/2002 | Dickson et al. |
| 2002/0178085 A1 | 11/2002 | Sorensen |
| 2004/0056091 A1 | 3/2004 | Overhultz et al. |
| 2004/0111320 A1 | 6/2004 | Schlieffers et al. |
| 2007/0106705 A1 | 5/2007 | Chalana |
| 2007/0143188 A1 | 6/2007 | Kelley et al. |
| 2009/0170532 A1 | 7/2009 | Lee et al. |
| 2009/0270096 A1 | 10/2009 | Somasundaram et al. |
| 2009/0305667 A1 | 12/2009 | Schultz |
| 2011/0081919 A1 | 4/2011 | Das et al. |
| 2011/0188389 A1 | 8/2011 | Hedley et al. |
| 2012/0019393 A1 | 1/2012 | Wolinsky et al. |
| 2012/0029817 A1 | 2/2012 | Khorashadi et al. |
| 2012/0095678 A1 | 4/2012 | Moore et al. |
| 2012/0191512 A1 | 7/2012 | Wuoti et al. |
| 2012/0284132 A1 | 11/2012 | Kim |
| 2012/0293305 A1* | 11/2012 | Shaw .................... G06Q 20/102 340/8.1 |
| 2013/0029686 A1 | 1/2013 | Moshfeghi |
| 2013/0050021 A1 | 2/2013 | Wang et al. |
| 2013/0085345 A1* | 4/2013 | Geisner ................. G06Q 30/00 600/300 |
| 2013/0203036 A1* | 8/2013 | Jabara ................... H04W 8/005 434/350 |
| 2013/0267253 A1 | 10/2013 | Case et al. |
| 2014/0113560 A1* | 4/2014 | Graube .................... H04B 7/26 455/41.2 |
| 2014/0209681 A1 | 7/2014 | Chen et al. |

FOREIGN PATENT DOCUMENTS

| | | |
|---|---|---|
| EP | 1501034 A1 | 1/2005 |
| EP | 2381409 A2 | 10/2011 |
| JP | 2002/132886 A | 5/2002 |
| WO | WO 2012/168515 A1 | 12/2012 |

OTHER PUBLICATIONS

Kopytoff, "Stores Sniff Out Smartphones to Follow Shoppers," MIT Technology Review Business Report, http://www.technologyreview.com/news/520811/stores-sniff-out-smartphones-tofollow- shoppers/, Nov. 12, 2013, accessed Aug. 18, 2014, 3 pgs.

Swedburg, "Carrefour to Use Bluetooth Beacons to Track Carts, Baskets," RFiD Journal, http://www.rfidjournal.com/articles/view?11991Disclosing Bluetooth beacons to identify the locations of carts and baskets moving around stores & provide shopper behavior analytics, Jul. 21, 2014, accessed Aug. 18, 2014, 2 pgs.

"Supermarkets Install Sensors That Could Help You Save (or Spend More)," Coupons in the News, http://couponsinthenews.com/2014/01/07/supermarkets-install-sensors-thatcould-help-you-save-or-spend-more/Discloses multiple Bluetooth sensors in store with incentives for agreeing to be "tracked" in the form of coupons and discounts, Jan. 7, 2014, accessed Aug. 18, 2014, 10 pgs.

Baloch et al, "A New Medium Access Protocol for RFID Networks with Foresight," Wireless Telecommunications Symposium (WTS), http://ieeexplore.ieee.org/xpls/abs_all.jsp?arnumber=5960846, 2011, accessed Aug. 18, 2014, 2 pgs.

Kourouthanassis, et al, "Intelligent cokes and diapers: MyGrocer Ubiquitous Computing Environment," First International Mobile Business Conference, 2002, 15 pgs.

* cited by examiner

SMART MACHINE TO MACHINE BEHAVIOR TRACKING

CROSS REFERENCE TO RELATED APPLICATIONS

This application is a continuation of, and claims priority to, U.S. patent application Ser. No. 14/548,935, filed Nov. 20, 2014, entitled "Smart Machine to Machine Behavior Tracking," the entire contents of which are hereby incorporated herein by reference.

BACKGROUND

Customer behavior information is a valuable resource for companies and is increasingly used to make business decisions. Collecting, analyzing, and utilizing this information is challenging, however. Relying on customer feedback through interviews, focus groups, and surveys is costly, time-consuming, and unreliable. The information collected through these practices is limited and subjective.

SUMMARY

As disclosed herein, M2M devices may be utilized for tracking and utilizing customer behavior.

In an aspect, an apparatus for tracking and utilizing customer behavior with M2M devices may comprise a processor and memory coupled to the processor. The memory may comprise executable instructions that when executed by the processor may cause the processor to effectuate operations. The operations may include automatically collecting via a short-range communication mechanism, in response to receiving a trigger, location information pertaining to a device within a region, and generating, based on the collected location information, a location profile associated with the device.

In an aspect, a method for intelligent traffic routing may comprise determining device conditions pertaining to a device, determining network conditions pertaining to a network, and based on the device conditions and the network conditions, determining a network entity with which the device is to communicate with the network, wherein communications between the device and the network utilize an address based on the device and the network entity.

In an aspect, a computer readable storage medium comprises executable instructions that when executed by a processor cause the processor to effectuate operations comprising automatically collecting, via a short-range communication mechanism, and in response to receiving a trigger, location information pertaining to a device within a region, and generating, based on the collected location information, a location profile associated with the device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

Aspects of the herein described smart M2M behavior tracking are described more fully herein with reference to the accompanying drawings, in which example embodiments are shown. In the following description, for purposes of explanation, numerous specific details are set forth in order to provide an understanding of the various embodiments. However, the instant disclosure may be embodied in many different forms and should not be construed as limited to the example embodiments set forth herein. Like numbers refer to like elements throughout.

DETAILED DESCRIPTION OF ILLUSTRATIVE EMBODIMENTS

Figure 1:
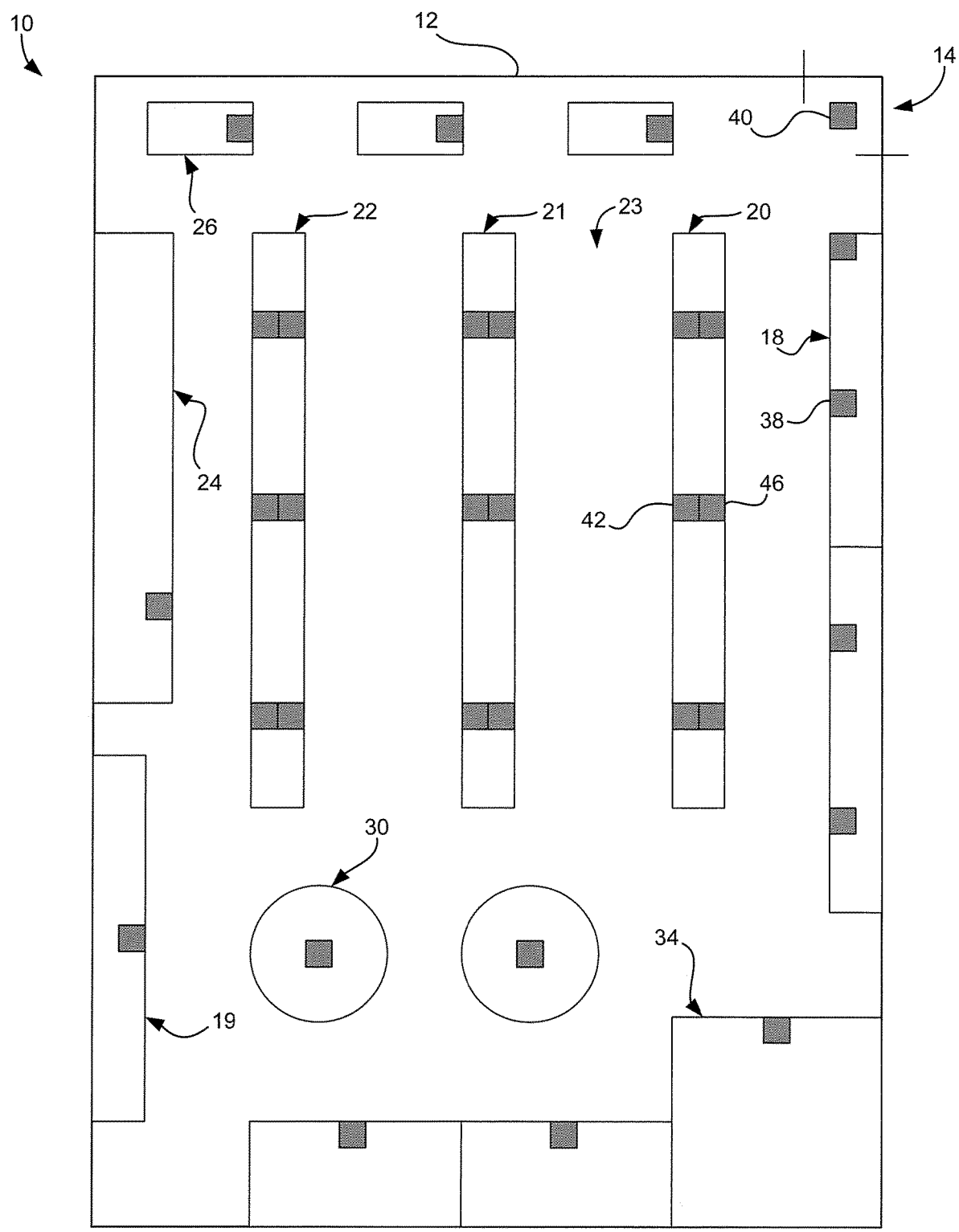
FIG. 1 illustrates a layout of an example venue including short-range communication devices.

FIG. 1 illustrates a layout of an example venue including short-range communication devices that may be used to facilitate smart M2M behavior tracking. As shown in FIG. 1, venue 10 may include ingress/egress point 14, product containers 18, 19, 20, 21, 22, 24, 30, and 34, point of sale 26, and aisles 23 defined by product containers 18, 19, 20, 21, 22, 24, 30, and 34. Venue 10 may include short-range communication devices, such as short-range communication devices 38, 40, 42, and 46. Short-range communication devices may be located throughout venue 10. For example, short-range communication device 38 as shown is mounted on product container 18. Short-range communication device 42 is mounted on product container 20 adjacent to short-range communication device 46. Ingress/egress short-range communication device 40 may be located in relative proximity to ingress/egress point 14. The layout of short-range communication devices in venue 10 may correspond to product regions designating locations where classes of products are located. Furthermore, the short-range communication devices may define the entirety of a region, such as a shopping region, wherein customers evaluate and purchase products. This may allow for a distinction between regions of a venue dedicated to restroom facilities, administrative offices, HVAC equipment, and other facilities management purposes.

The short-range communication devices depicted may be in communication with all the other short-range communication devices, a subset, or not in communication with the other short-range communication devices at all. Short-range communication devices may share functions, have unique functions, and may change functions. Groups of short-range communication devices may be organized by, for example, function, technology, location, power level, customer traffic, time, operator preference, and role. A short-range communication device may be in multiple groups. Group membership may determine function and purpose for a short-range communication device.

As an example of a function, short-range communication device 132 at point of sale 26 may process payment for products being purchased from venue 10. Payment may be achieved in one or more of several ways. For example, products may be collected from venue 10 and brought to point of sale 26 where they are scanned by short-range communication device 132. Scanning may involve, for example, scanning and interpreting barcodes, quick response (QR) codes, and radio frequency identification (RFID) tags. An amount due is tabulated and short-range communication device 132 may accept payment made using the device. In another example, products may be scanned and paid for at each short-range communication device. A running list may also be generated by a scan of product barcodes, QR codes, RFID tags, and the like, at any short-range communication device, which may be then computed and paid at short-range communication device 132 at point of sale 26. A customer profile associated with the purchaser, and may comprise account information for payment.

Short-range communication devices may use communication technologies such as Bluetooth, near field communications (NFC), and Wi-Fi, individually, in combination, and under certain circumstances or for certain activities. For example, a short-range communication device may use Bluetooth to connect and communicate with a customer's device, NFC to scan tags on products and accept payment from NFC-enabled devices, and Wi-Fi to connect to a wireless local area network (WLAN). Furthermore, short-range communication devices may include sensors, such as, for example, proximity sensors, pressure sensors, humidity sensors, position sensors, and temperature sensors.

As depicted in FIG. 1, product containers 18-22, 24, 30, and 34 may comprise any appropriate type of apparatus to hold, display, maintain, support, organize, and/or contain products. Some examples of product containers 18-22, 24, 30, and 34 are shelving, bins, racks, crates, pallets, barrels, rooms, cases, boxes, and combinations of the foregoing examples. They may have power supplies, electricity, and particular features such as chillers, condensers, and heating elements. Furthermore, product containers 18-22, 24, 30, and 34 may be designed to maintain and hold a specific product or products, or a specific class or classes of products. Product containers 18-22, 24, 30, and 34 may serve a specific role in venue 10. For example, product container 34 may be a pharmacy located inside venue 10. As other examples, product container 24 may be a bakery and product container 30 may be a clothing rack or produce display.

Figure 2:
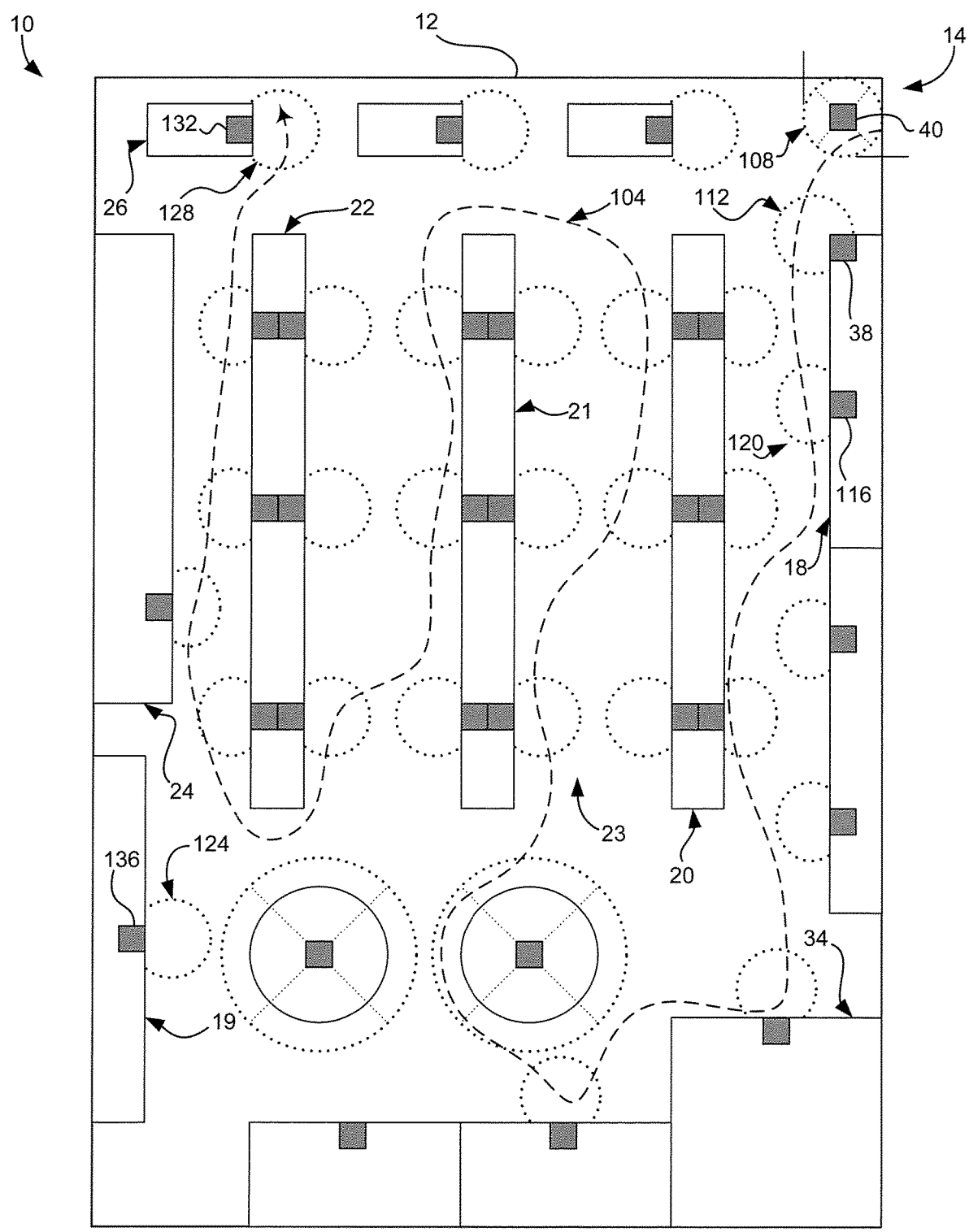
FIG. 2 is a depiction of the example venue of FIG. 1 showing exemplary illustrations of coverage regions and a route taken by a wireless transmit/receive unit through the venue.

FIG. 2 depicts exemplary illustrations of coverage regions and an exemplary route taken by a wireless transmit/receive unit (WTRU) through venue 10. Route 104 begins at ingress/egress point 14 and ends at point of sale 26. As the WTRU comes within a coverage area 108 of ingress/egress short-range communication device 40, the WTRU may cause short-range communication device 40 to generate a trigger. That trigger may be processed in various ways by ingress/egress short-range communication device 40. For example, ingress/egress short-range communication device 40 may generate location information for the WTRU, catalog the trigger in a database, check the trigger information against an existing record of WTRU identities, ignore it, or some combination of those actions. When route 104 passes through coverage area 112, short-range communication device 38 may similarly be triggered. When route 104 passes through coverage area 120, short-range communication device 116 may be triggered accordingly. As route 104 does not pass through coverage area 124, short-range communication device 136 is not triggered.

Coverage areas 108, 112, 120, 124, 128, etc. may be a default or specified proximity of a corresponding short-range communication device. A default proximity may be, for example, the maximum range of the short-range communication device. In another aspect, the default proximity is the default proximity set by a server in network communication with the short-range communication device. In another aspect, the proximity may be specified at the device level or through a server in communication with the device. In another aspect, the specified proximity may be tied to a common scheme shared by two or more short-range communication devices. The devices sharing the scheme may share a product container, aisle, region, product region, shopping region, or some subdivision thereof.

A particular WTRU may lack certain functionality. For example, a WTRU may lack Bluetooth, Wi-Fi, or other hardware or software. Existing functionality of a WTRU may also be enhanced. A shopping device, such as a shopping cart or shopping basket, may be equipped with communication devices capable of communicating with short-range communication devices. These shopping devices may be equipped to interface with WTRUs through a variety of interfaces and protocols, such as Universal Serial Bus (USB), including Mini and Micro USB, IEEE 1394 ("FireWire"). The shopping device may interface with a WTRU through one of these interfaces, allowing additional or enhanced functionality. In one aspect, a shopping cart may have one or more RFID readers, and may interface with a WTRU through a USB interface. The shopping device may then provide or enhance RFID reading capabilities of the WTRU.

Figure 3:
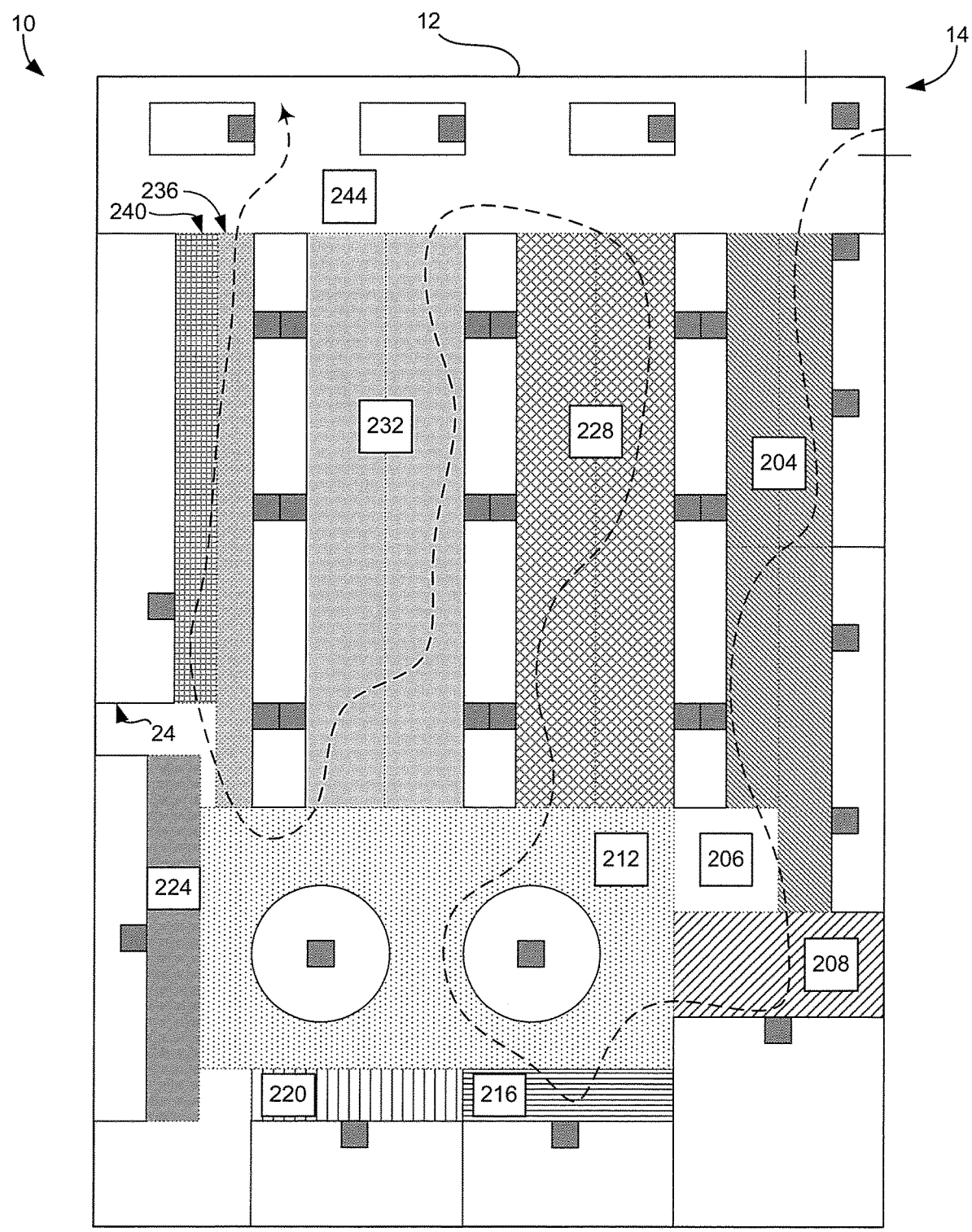
FIG. 3 is a depiction of the example venue of FIGS. 1 and 2, and the route of FIG. 2, showing the venue divided into product regions.

FIG. 3 is a depiction of venue 10 as in FIGS. 1 and 2, and route 104 of FIG. 2, showing venue 10 divided into region 12 and product regions. Region 12 may be a shopping region. Product regions 204, 206, 208, 212, 216, 220, 224, 228, 232, 236, and 240 are distinguished in FIG. 3 by different shadings. A product region may be defined in addition to region 12 as a subset of region 12. A product region may be defined by the layout of products in a venue, and may be implemented by the short-range communication devices. For example, product region 204 in venue 10 may correspond to "dairy," "women's shoes," "clearance," or any classification desired to describe the class or type of products present in that region of venue 10. In another example, product region 206 may have a "null" or "inactive" designation. However, product regions may also correspond to any type of categorization or label desired. For example, product region 232 may correspond to "experimental," "poor performing," "high margin," "organic," "Supplier A," "video advertisements available," "current promotion," "interactive," or a combination of categories. Short-range communication devices may be designated as 'resident' in one of these product regions, and the may be either closely or loosely defined by the scope and configuration of their coverage regions. Areas of a venue dedicated to administrative space, restrooms, and other areas may be excluded entirely, even if they contain short-ranged communication devices, or designated as excluded regions.

Figure 4:
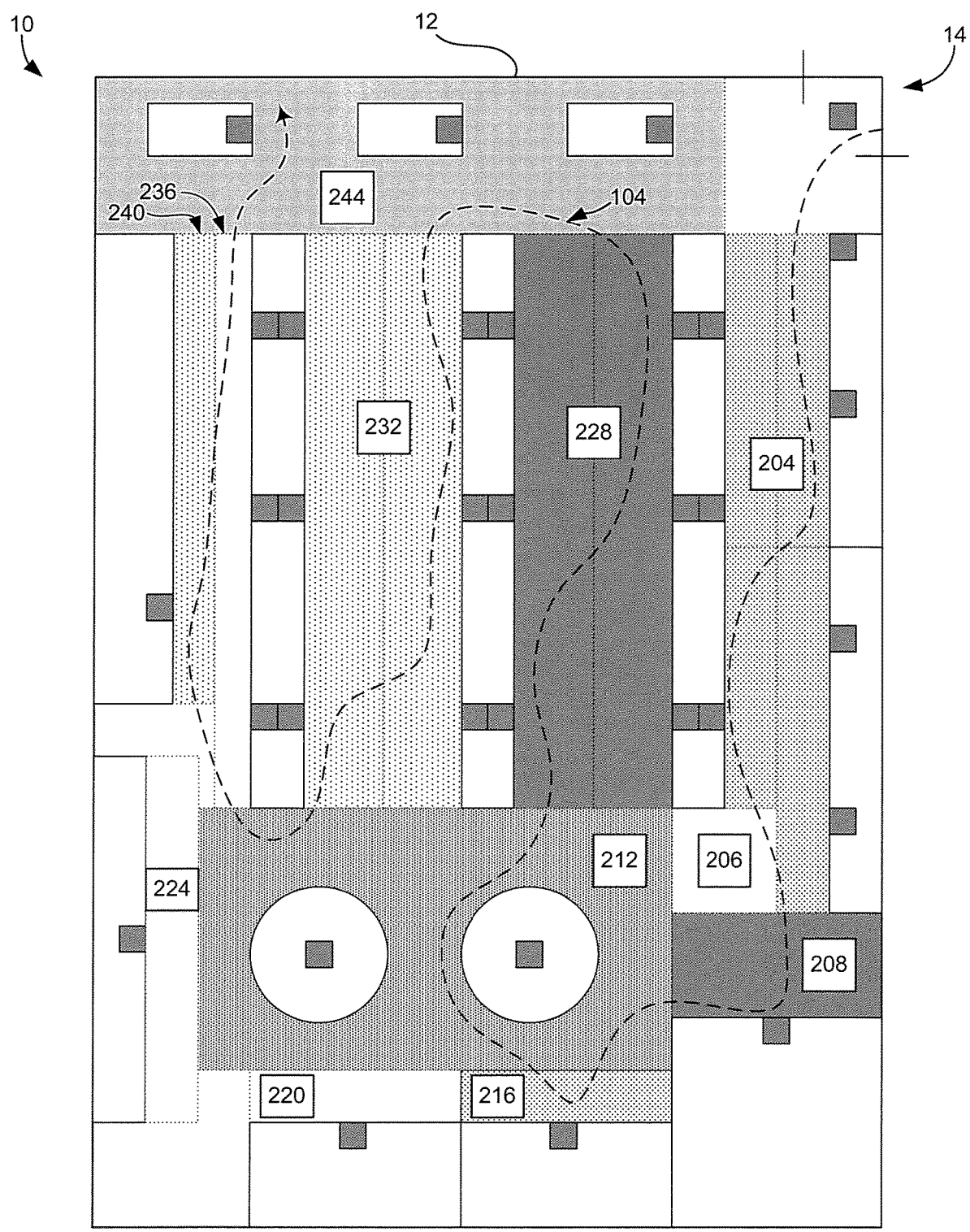
FIG. 4 is a depiction of the example venue of FIGS. 1, 2, and 3, and the route of FIGS. 2 and 3, showing an exemplary representation of historical location data.

FIG. 4 is a depiction of venue 10 of FIGS. 1, 2, and 3, and route 104 of FIGS. 2 and 3, showing an exemplary representation of historical location data. As discussed herein, short-range communication devices may identify, automatically or otherwise, WTRUs and generate location data for them. The location data may be stored, for example, in a database, and referenced when the WTRU triggers a short-range communication device. In one aspect, a location profile would be generated for route 104 as the WTRU was going through the path. That location profile for that visit to venue 10 would be logged and aggregated with other visits to venue 10 (and possibly other venues as explained in relation to FIG. 5). In FIG. 4, the boldness of the shading of a particular product region reflects an exemplary set of historical location data generated from location profiles. The amount of traffic the WTRU took through the product regions is directly correlated with the boldness of the shading, with greater boldness indicating greater traffic as indicated by the historical location data. For example, product regions 220 and 224 received very little traffic in comparison to product regions 208 and 228. In one aspect, location profile data may be excluded from collection or excluded from analysis. For example, while product region 206 had no short-range communication device collecting customer location information, product region 244 did. However, that region is opaque because the data is either not saved, deleted as it is collected, or protected from being accessed. This type of customer information may be aggregated from many customers and analyzed to create statistics on a larger scale.

A location profile may be used to generate routes automatically, on-demand, or otherwise. A route may be generated for a device based on products, product regions, prices, stock/availability, and other information. For example, ingress/egress short-range communication device 40 may receive information from a WTRU entering coverage region 108, indicating preferences, interests, shopping history, public assistance program enrollment (such as the Supplemental Nutrition Assistance Program (SNAP)), discount program membership (or lack thereof), a shopping list, budget, and other information. In another aspect, ingress/egress short-range communication device 40 may receive this information from another source in response to the WTRU entering coverage region 108. Furthermore, the WTRU may have location profiles associated with it. This information may be used to generate a route. The generated route may be sent to the device. For example, a prior location profile for the WTRU (or a different WTRU) may be accessed and the route the profile was generated from may be sent to the WTRU.

In another aspect, a route may be generated based on a list of items received by short-range communication device 40. The route may comprise a sequence of short-range communication devices to go to (enter their respective coverage regions). This may be determined based on a product or product region associated with the respective short-range communication device. The generated route may be updated based on items removed, added, or substituted in the list. For example, an item on or off the list may be purchased using a short-range communication device, and the list may be updated to reflect that purchase. The route may also be updated based on the actual route taken. For example, if a short-range communication device not on the generated route is triggered by the device, a new route may be generated, automatically or otherwise, and sent to the device. The route may be optimized in one or more ways. For example, a preference may be indicated for a certain brand of items, and a route may be generated comprising short-range communication devices to go to (enter their respective coverage regions) associated with products or product regions containing items of that brand. In another aspect, a route is generated based on enrollment in a public assistance program providing subsidies for certain items. The route may be directed to the locations of qualifying items in the program. In another example, the shortest route (by distance and/or time) may be generated. For example, a list of items may be received and the route may be generated to fulfill that list through the shortest route through a venue. In another example, a route may be saved by, for example, the device, a short-range communication device, a third-party server, or a combination of them. The saved route may be sent, automatically or by request, to the device or another device, and may be edited and updated. For example, a saved route may be shared with other devices. A location profile may be generated and associated with the route taken, and may include the generated route and actual route.

Figure 5:
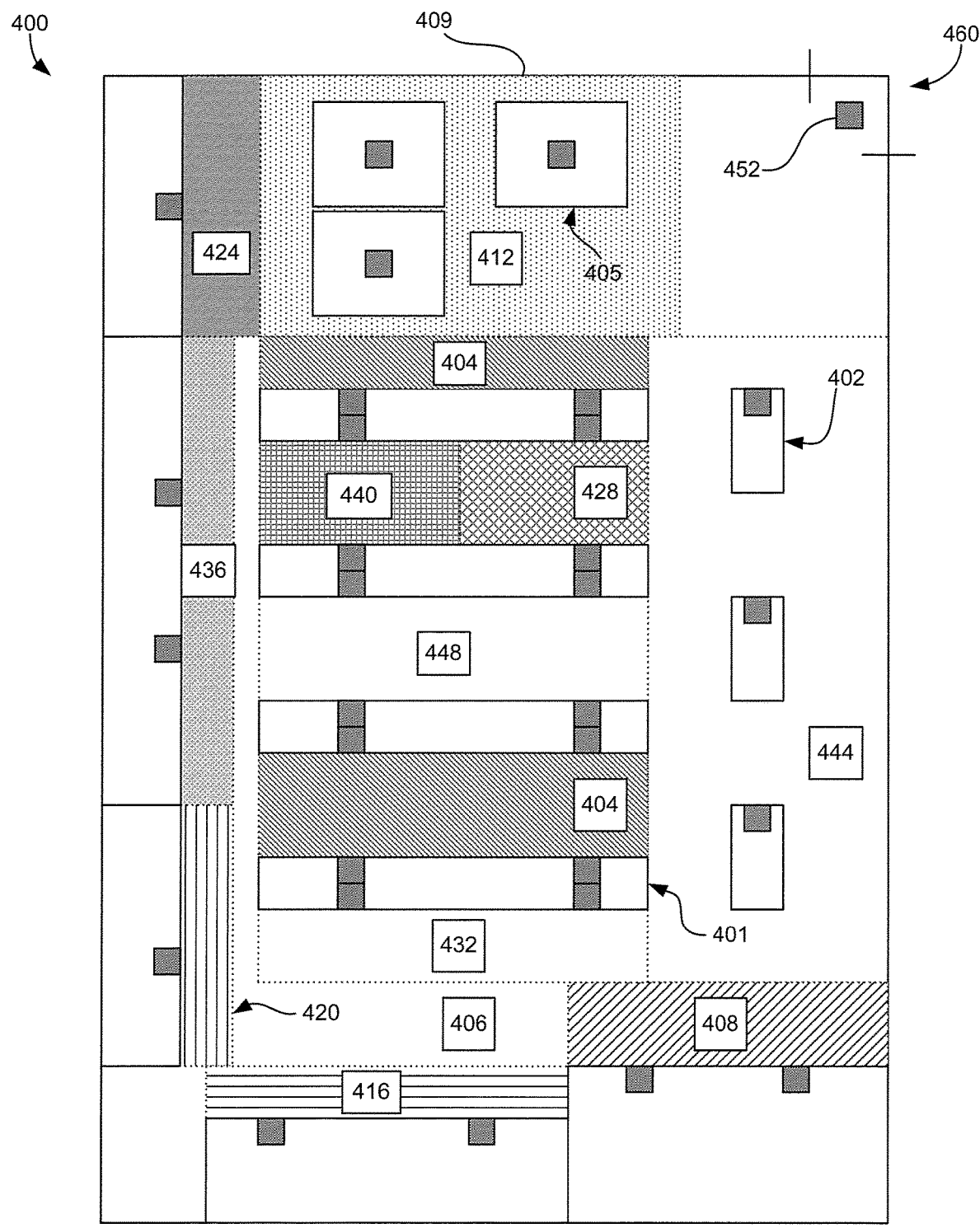
FIG. 5 illustrates a layout of a second example venue including short-range communication devices, the second example venue divided into product regions.

FIG. 5 illustrates a layout of venue 400. A WTRU may be utilized in more than one venue. Customer behavior data for a particular customer may require multiple visits by the customer to establish enough data and a high enough confidence level for useful conclusions to be drawn. If a customer does not routinely visit one venue, or alternates between venues for a particular offering, gathering useful data for that customer's behavior may take significant time, or may never occur if the customer's visits never generate enough data. For example, a grocery store chain may wish to track customer behavior using information gathered regarding customer behavior aggregated from all the stores the customer visited, regardless of the frequency of the customer's visit to that particular location. However, layouts of the venues, including dimensions of the facility, may vary not be uniform between locations. The number, spacing, and configuration of short-range communication devices and product containers may not be uniform as well. For example, the grocery stores from the previous example may vary in total size and in the size of the sections of the stores.

While the actual physical layout may differ between venues of the same venture, they may maintain functionality and collect uniform customer data by keeping the product region organization parallel. For example, venue 400 may share many similarities with venue 10. Similar to venue 10, venue 400 may have product containers, such as product containers 401 and 405, points of sale, such as point of sale 402, and an ingress/egress point 460. However, as depicted in FIG. 5, the layout of venue 400 is not the same as that of venue 10. A shopping region and product regions, however, may be designated to carryover between the two. For example, product region of 404 may be designated the same as product region 204, product region 406 may be designated the same as product region 206, product region 408 may share the same designation(s) as product region 208, product region 412 may share the same product designation(s) as product region 212; product region 416 may share the same product designation(s) as product region 216; product region 420 may share the same product designation(s) as product region 220; product region 424 may share the same product designation(s) as product region 224; product region 428 may share the same product designation(s) as product region 228; product region 432 may share the same product designation(s) as product region 232; product region 444 may share the same product designation(s) as product region 244. However, venue 400 may also have additional or nonanalogous product regions not present in venue 10, such as product region 448 and product region 440.

Figure 6:
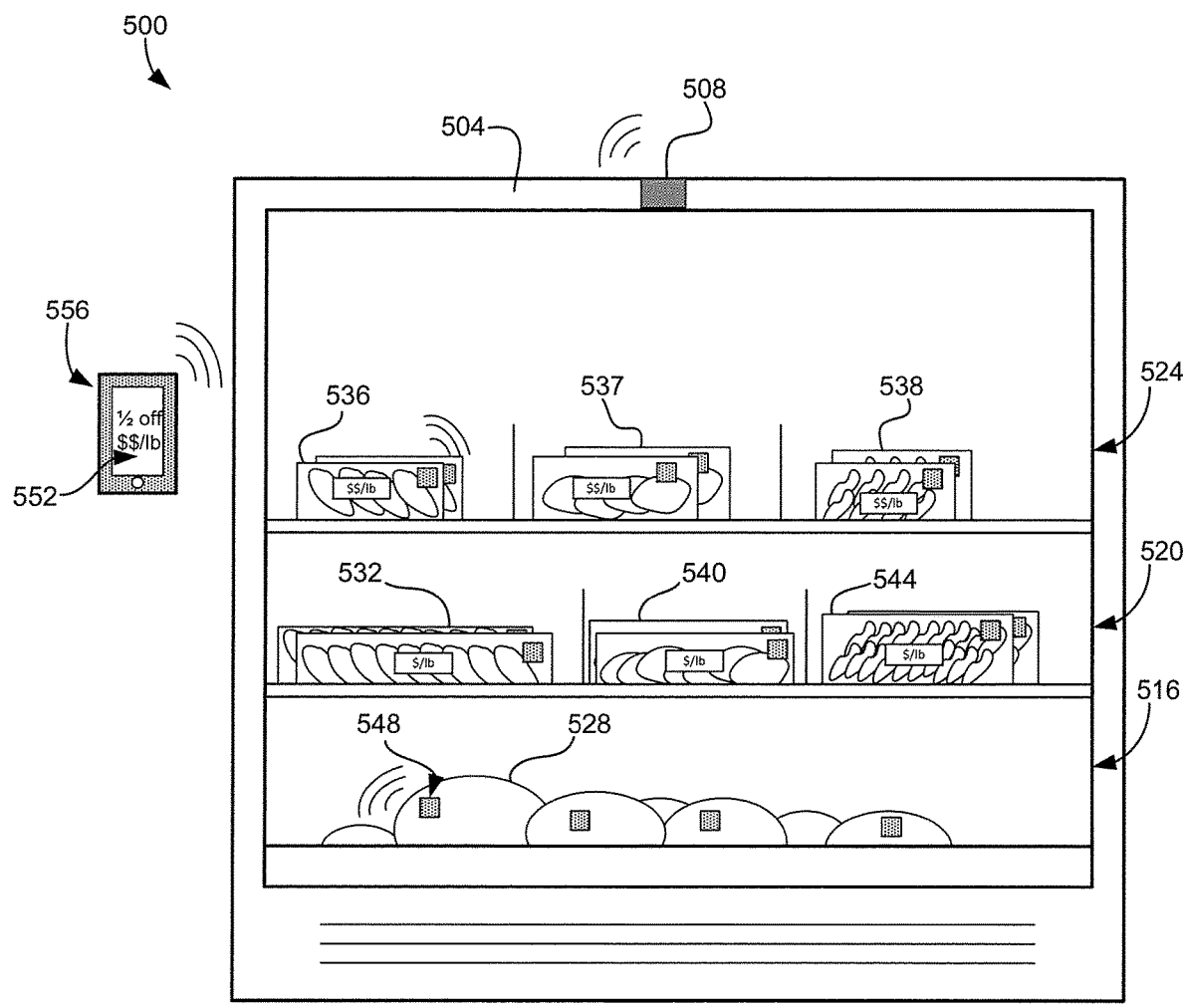
FIG. 6 is a depiction of an exemplary interaction between a wireless transmit/receive unit and an exemplary product container with an exemplary short-range communication device and exemplary products arranged in an exemplary product layout.

FIG. 6 is a depiction of an exemplary interaction between WTRU 556 and exemplary product container 500 with exemplary short-range communication device 508 and exemplary products arranged in an exemplary product layout. Product container 500 may have a casing 504 containing electrical systems in addition to short-range communication device 508, as well as equipment that may be necessary for the products product container 500 is intended to house. This may be equipment such as refrigeration equipment for perishable products such as meat. Product container 500 may have an organization for the products it contains. The layout may correspond to a planogram, and may divide products based on pricing, quality, sourcing, margin, dimensions, weight, supplier arrangements and agreements, volume of sales, season, geographic location, population, demographics of the location, or a combination of these and other factors.

In FIG. 6, product container 500 is subdivided into shelves 516, 520, and 524. Shelf 516 corresponds to low margin products 528, shelf 520 corresponds to middle-margin products, and shelf 524 corresponds to high margin products. Shelves 520 and 524 are further subdivided by product type differentiation, with 532 and 536 sharing a type, 537 and 540 sharing a type, and 538 and 544 sharing a type. Each product may have short-range communication tag 548, such as an RFID tag or an NFC tag. Short-range communication tag 548 may be affixed to an individual product, to a location on product container 500 where the related product is stored, on a sign individually or collected with others, or made accessible in some other way to a user of WTRU 556. Short-range communication tag 548 may communicate with WTRU 556 directly, or via short-range communication device 508. For example, WTRU 556 may be equipped with an NFC tag reader and/or an RFID tag reader. Once in range, WTRU 556 may read short-range communication tag 548. Short-range communication tag 548 may then provide information regarding the product it is tied to. In one example, the short-range communication tag for an item of product 536 is read by WTRU 556.

Reading the tag may trigger the transmission and display of advertisement 552 on WTRU 556. For example, the manufacturer or distributor of item 536 may send a video to WTRU 556, or the owner of the venue may send a special offer or coupon to WTRU 556, or information regarding product 536 may be provided, or some combination. In one example, a database may contain shopping records for WTRU 556 at that chain of venues. The shopping records may indicate that WTRU 556 is always involved in the purchase of low-margin item 528. The owner of the venue or the supplier of high-margin item 536 may provide promotions to WTRU 556 based on that information. For example, this may be to encourage adoption of high-margin item 536 or middle-margin item 532, for example, over low-margin item 528. In another example, items related to item 536 may be advertised based on the availability of related items. Furthermore, the decision to deliver advertising content or a promotion may be made using location information and historical location information, as shown in FIG. 3, and may be subject to authentication measures and customer preferences.

Advertisement 552 may be sent to WTRU 556 based on location information and historical location information. In one aspect, location information for WTRU 556 may indicate a product region, as depicted in FIG. 3, for example. The product region may control the content of advertisement 552. In another aspect, advertisement 552 is determined based on historical location information, such as depicted in FIG. 4, for WTRU 556. Advertisement 552 may be provided based on the frequency of WTRU 556 traffic in the product region or another product region. For example, if product container 504 was present in product region 228, advertisement 552 may be provided based on the data indicating it as a high-traffic region for WTRU 556. For example, advertisement 552 may comprise information regarding another product region, such as product region 224 of FIG. 4. In another example, advertisement 552 may comprise information regarding a different product region in venue 10 with a specific route from the product region WTRU 556 is present in. For example, WTRU 556 and product container 504 may be in product region 240 of FIGS. 3 and 4, and a route to product region 216 may be determined to comprise product regions 236 and 212. The route may be an optimal route based on distance, obstacles, traffic, or may be based on the most common routes taken according to aggregated historical location behavior data, or a combination of them. In another aspect, advertisement 552 only comprises information regarding a different product region if the route to that product region comprises a certain product region or a product region within a certain threshold traffic level based on historical data. Based on that information, advertisement 552 may comprise information regarding a product or product region in venue 10 with a certain route to it. For example, if product container 504 is present in product region 216, advertisement 552 is may comprise an information on a product in product region 224.

Advertisement 552 may also be sent to WTRU 556 based on a customer preference. A customer preference may indicate whether or not to send advertisement 556, the format of advertisement 552 (such as video, text, audio, images), the delivery mechanism, and other data. Advertisement 552 may also be sent to WTRU 556 based on technical information received from WTRU 556. Information may be received from WTRU 556 comprising WTRU 556 device capabilities, functionality, software installed or absent, operating system, technical specifications, and registration with the operator of venue 10 or a third party, among other information.

Figure 7:
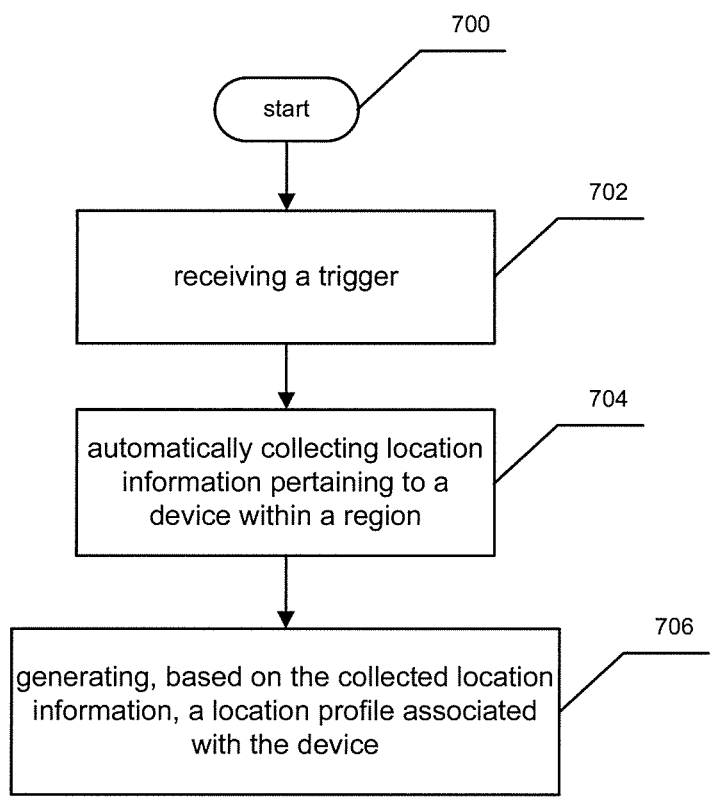
FIG. 7 is a depiction of an exemplary flow chart illustrating aspects of the present disclosure.

FIG. 7 is a depiction of an exemplary flow chart illustrating aspects of the present disclosure. At 700, the operations begin, for example, by a device such as a WTRU entering venue 10. In 702, a trigger is received. For example, a short-range communication device, such as ingress/egress short-range communication device 40, may receive a trigger or generate a trigger when the WTRU enters its coverage region, such as coverage region 108. In 704, location information pertaining to a device within a shopping region is automatically collected. For example, information regarding a WTRU may be automatically collected by ingress/egress short-range communication device 40 when the WTRU enters coverage region 108. The information may, for example, comprise information that the device is currently located in that region. The information may comprise, alternatively or in addition to the location of the device in that region, further detail, such as a specific coverage area the device is present in, identification of the specific short-range communication device collecting the information, a product region the device the device is present in, the venue the device is present in, the Global Positioning System (GPS) information, or other information. In 706, a location profile associated with the device is generated based on the collected location information. The location profile may comprise location information collected regarding the device as it triggers short-range communication devices. In one aspect, the location profile comprises a route taken by the device through venue 10. In one aspect, a certain event, action, time, or other trigger may cease the collection of location information by short-range wireless communication devices. In one aspect, collection of location information may cease when the device is associated with payment. In another aspect, collection of location information may cease when a trigger is received by a specific short-range communication device, such as ingress/egress short-range communication device 40 or point of sale short-range communication device 132. In another aspect, collection of location information of a device may cease and restart. A location information profile may be included in a database. The location information profile may be aggregated with other location information profiles of the device collected at venue 10, and other venues, such as venue 400.

Figure 8:
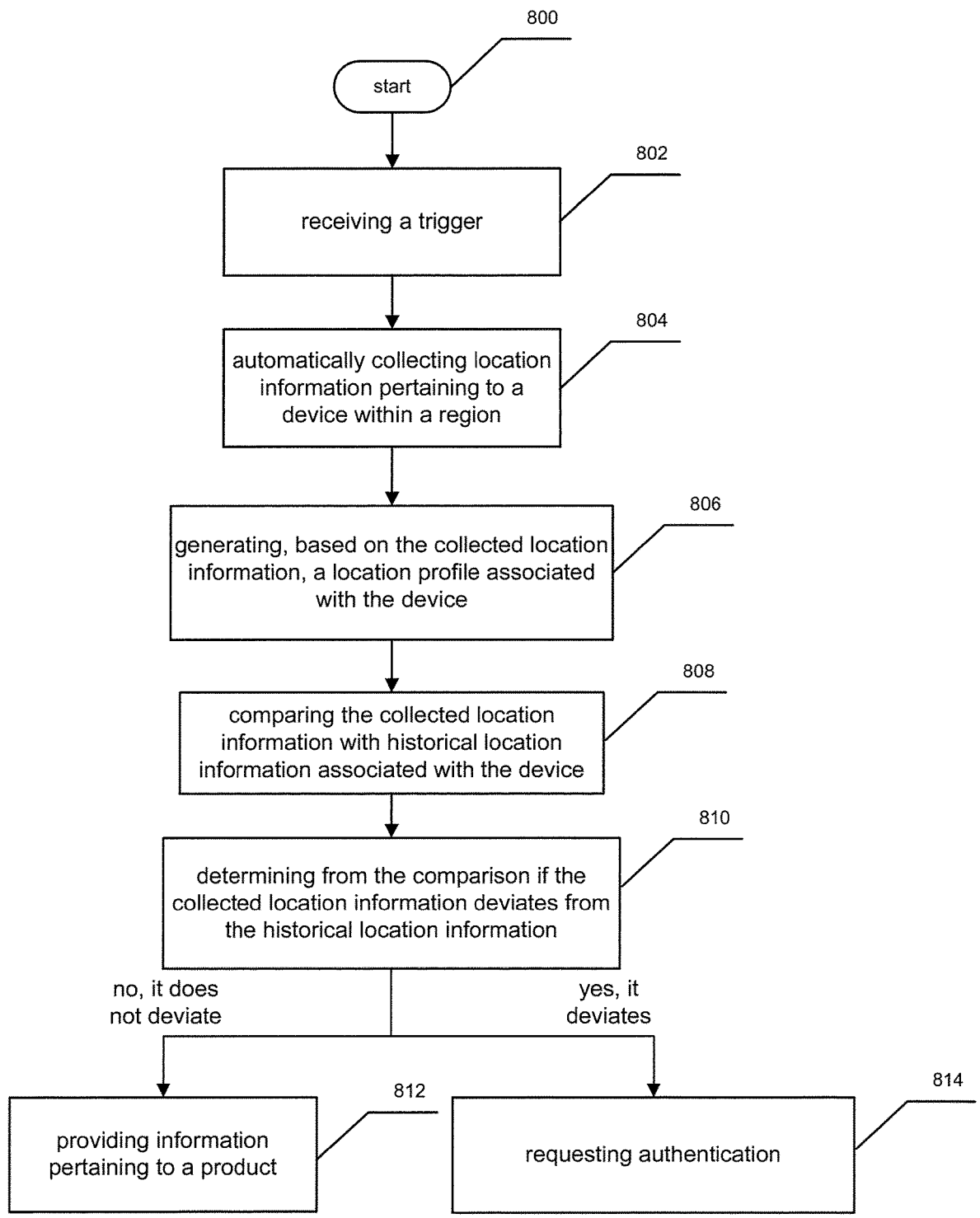
FIG. 8 is a depiction of an exemplary flow chart illustrating aspects of the present disclosure.

FIG. 8 is a depiction of an exemplary flow chart illustrating aspects of the present disclosure. At 802, a trigger is received, similar to 702. At 804, location information pertaining to a device within a region is automatically collected, similar to 704. At 806, a location profile associated with the device is generated based on the collected location information, as in 706. In 808, the collected location information is compared with historical location information associated with the device. In 810, it is determined from the comparison if the collected location information deviates from the historical location information. In 812, if it does not deviate, information pertaining to a product is provided. In 814, if it does deviate, authentication is requested.

In one aspect, a location profile is generated for a device in venue 10. Historical location data may comprise location information for a device related to previously generated location information. In one aspect, a device may be associated with historical location information comprising multiple previous routes taken through venue 10. The historical location data may be aggregated and analyzed. For example, FIG. 4 is a depiction of exemplary historical location data. In FIG. 4, product regions 208 and 228 are heavily trafficked by the device associated with the location information, while product regions 224 and 220 are not heavily trafficked. As location information is collected, it may be compared with the historical location data. Route 104 may be analyzed as it is generated from location information. A deviation may comprise a difference between location information and historical location information. For example, in FIG. 4, the historical location information indicates that product region 224 is rarely or never trafficked. If the location information indicates that the device is in product region 224, authentication may be requested. Authentication may comprise a password, answering challenge questions, or other authentication processes. Authentication may comprise third party authentication, such as sending an authentication request to a third party device or party. In one aspect, authentication is requested when the device scans a product associated with a product region that, based on historical location data, has not been trafficked before or has never been trafficked. For example, in FIG. 6, if WTRU 556 scans short-range communication tag 548, and WTRU 552, based on historical location data, has never been present in the product region, or has not trafficked that product region enough to meet a threshold, it is a deviation. An authentication request may then be sent to WTRU 556 by, for example, short-range communication device 508 or short-range communication tag 548. If authentication is successful, information or advertisement 552 may be sent to WTRU 552.

Additional information may be considered to determine if authentication should be requested. For example, information regarding products purchased using the device, information in a user profile affiliated with the device, pricing data, product data, date and time information, or other information may be used to determine if authentication should be requested. For example, if short-range communication tag 548 applies to a product with a special promotion, authentication may not be requested. In another aspect, a user profile associated with the device comprises parental controls requiring third party authorization for certain activities.

Figure 9:
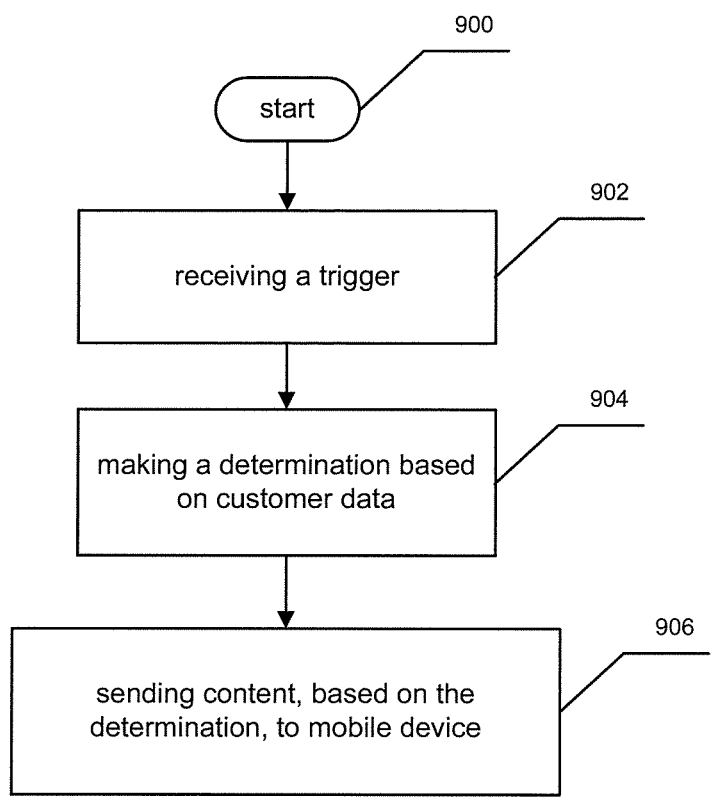
FIG. 9 is a depiction of an exemplary flow chart illustrating aspects of the present disclosure.

FIG. 9 is a depiction of an exemplary flow chart illustrating aspects of the present disclosure. In 902, a trigger is received. This trigger may be caused by, for example, the scanning of an item with an RFID or NFC tag, as depicted, for example, in FIG. 6. In another aspect, the trigger may be caused by, for example, a WTRU coming within a default or specified proximity of a short-range communication device, such as, for example, a WTRU entering coverage area 112 of short-range communication device 38 as depicted in FIG. 2. A default proximity may be, for example, the maximum range of the short-range communication device. In another aspect, the default proximity is the default proximity set by a server in network communication with the short-range communication device. In another aspect, the proximity may be specified at the device level or through a server in communication with the device. In another aspect, the specified proximity may be tied to a common scheme shared by two or more short-range communication devices. The devices sharing the scheme may share a product container, aisle, region, product region, shopping region, or some subdivision thereof.

Figure 10:
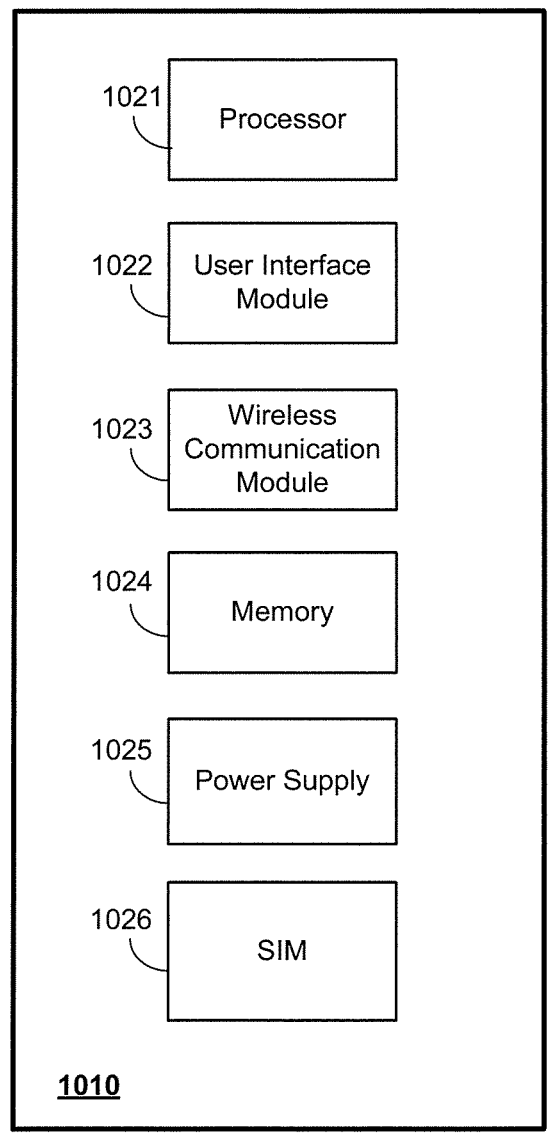
FIG. 10 is a block diagram of an example mobile device which may be utilized to facilitate smart M2M behavior tracking.

FIG. 10 illustrates an example wireless device 1010 (i.e., WTRU) that may be used in connection with an example of smart M2M behavior tracking. References will also be made to other figures of the present disclosure as appropriate. For example, mobile devices, such as WTRU 556, may be wireless devices of the type described in regard to FIG. 10, and may have some, all, or none of the components and modules described in regard to FIG. 10. It will be appreciated that the components and modules of wireless device 1010 illustrated in FIG. 10 are illustrative, and that any number and type of components and/or modules may be present in wireless device 1010. In addition, the functions performed by any or all of the components and modules illustrated in FIG. 10 may be performed by any number of physical components. Thus, it is possible that in some examples the functionality of more than one component and/or module illustrated in FIG. 10 may be performed by any number or types of hardware or hardware and software.

Processor 1021 may comprise any appropriate circuitry that performs operations on behalf of wireless device 1010. Such circuitry may include hardware and other components that enable processor 1021 to perform any of the functions and methods described herein. Such circuitry and other components may also enable processor 1021 to communicate and/or interact with other devices and components, for example any other component of device of wireless device 1010, in such a manner as to enable processor 118 and such other devices and/or components to perform any of the disclosed functions and methods. In one example, processor 1021 executes software (i.e., computer readable instructions stored in a computer readable medium) that may include functionality related to smart M2M behavior tracking, for example. User interface module 1022 may be any type or combination of hardware and software that enables a user to operate and interact with wireless device 1010, and, in one example, to interact with a system enabling the user to place, request, and/or receive calls, text communications of any type, voicemail, voicemail notifications, voicemail content and/or data, and/or a system. For example, user interface module 1022 may include a display, physical and/or "soft" keys, voice recognition software, a microphone, a speaker and the like. Wireless communication module 1023 may be any type of transceiver including any combination of hardware and software that enables wireless device 1010 to communicate with wireless network equipment. Memory 1024 enables wireless device 1010 to store information, such as APNs, MNCs, MCCs, text communications content and associated data, multimedia content, software to efficiently process radio resource requests and service requests, and radio resource request processing preferences and configurations. Memory 1024 may take any form, such as internal random access memory (RAM), an SD card, a microSD card and the like. Power supply 1025 may be a battery or other type of power input (e.g., a charging cable that is connected to an electrical outlet, etc.) that is capable of powering wireless device 1010. SIM 1026 may be any type Subscriber Identity Module and may be configured on a removable or non-removable SIM card that allows wireless device 1010 to store data on SIM 1026.

Figure 11:
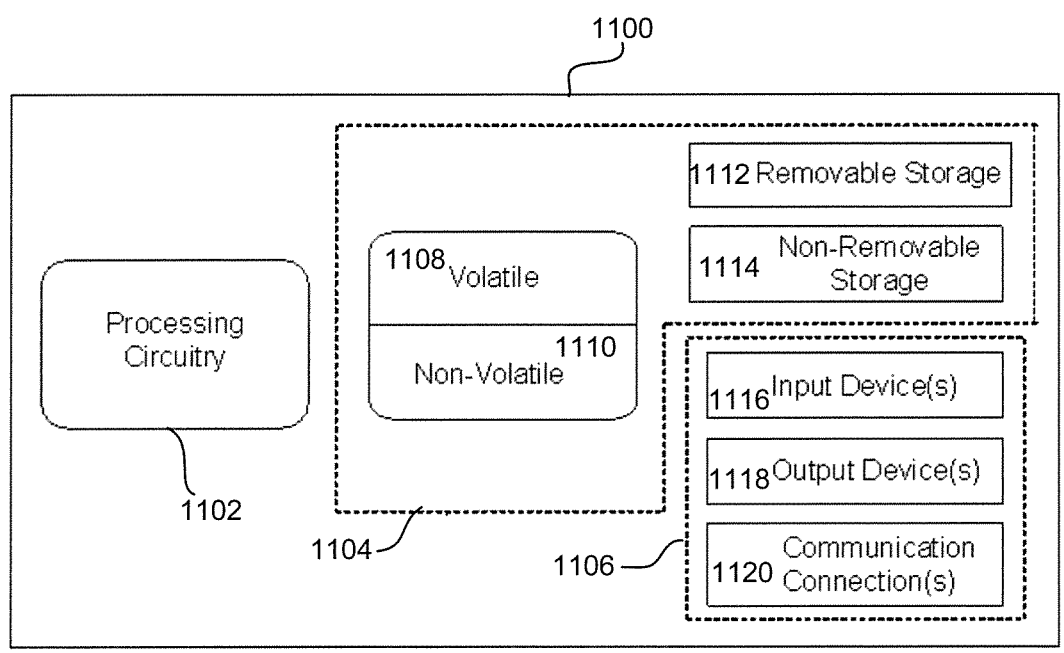
FIG. 11 is a block diagram of an exemplary processor in which one or more disclosed examples may be implemented for smart M2M behavior tracking.

FIG. 11 is a block diagram of an example apparatus 1100 which may be employed in any of the examples described herein, including as one or more components of WTRU 556, short-range communication device 38, 40, 42, and/or 46, short-range communication tag 548, and/or any related equipment, and/or as one or more components of any third party system or subsystem that may implement any portion of the subject matter described herein. Apparatus 1100 may be a processor. It is emphasized that the block diagram depicted in FIG. 11 is exemplary and not intended to imply a specific implementation. Thus, the apparatus 1100 may be implemented in a single processor or multiple processors. Multiple processors may be distributed or centrally located. Multiple processors can communicate wirelessly, via hard wire, or a combination thereof. Apparatus 1100 may include circuitry and other components that enable apparatus 1100 to perform any of the functions and methods described herein. Such circuitry and other components may also enable apparatus 1100 to communicate and/or interact with other devices and components, for example any other component of any device disclosed herein or any other device, in such a manner as to enable apparatus 1100 and such other devices and/or components to perform any of the disclosed functions and methods.

As depicted in FIG. 11, the apparatus 1100 may comprise a processing portion 1102, a memory portion 1104, and an input/output portion 1106. The processing portion 1102, memory portion 1104, and input/output portion 1106 are coupled together (coupling not shown in FIG. 11) to allow communications between these portions. The input/output portion 1106 is capable of providing and/or receiving components, commands, and/or instructions, utilized to, for example, request and receive APNs, MNCs, and/or MCCs, establish and terminate communications sessions, transmit and receive service requests and data access request data and responses, transmit, receive, store and process text, data, and voice communications, execute software that efficiently processes radio resource requests, receive and store service requests and radio resource requests, radio resource request processing preferences and configurations, and/or perform any other function described herein.

The apparatus 1100 may be implemented as a client processor and/or a server processor. In a basic configuration, the apparatus 1100 may include at least one processing portion 1102 and memory portion 1104. The memory portion 1104 can store any information utilized in conjunction with establishing, transmitting, receiving, and/or processing text, data, and/or voice communications, communications-related data and/or content, voice calls, other telephonic communications, etc. For example, the memory portion is capable of storing APNs, MNCs, MCCs, service requests, radio resource requests, QoS and/or APN parameters, software for smart M2M behavior tracking, text and data communications, calls, voicemail, multimedia content, visual voicemail applications, etc. Depending upon the exact configuration and type of processor, the memory portion 1104 can be volatile (such as RAM) 1108, non-volatile (such as ROM, flash memory, etc.) 1110, or a combination thereof. The apparatus 1100 can have additional features/functionality. For example, the apparatus 1100 may include additional storage (removable storage 1112 and/or non-removable storage 1114) including, but not limited to, magnetic or optical disks, tape, flash, smart cards or a combination thereof. Computer storage media, such as memory and storage elements 1104, 1108, 1110, 1112, and 1114, may include volatile and nonvolatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, universal serial bus (USB) compatible memory, smart cards, or any other medium that can be used to store the desired information and that can be accessed by the apparatus 1100. Any such computer storage media may be part of the apparatus 1100.

The apparatus 1100 may also contain the communications connection(s) 1120 that allow the apparatus 1100 to communicate with other devices, for example through a radio access network (RAN). Communications connection(s) 1120 is an example of communication media. Communication media typically embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection as might be used with a land line telephone, and wireless media such as acoustic, RF, infrared, cellular, and other wireless media. The term computer-readable media as used herein includes both storage media and communication media. The apparatus 1100 also can have input device(s) 1116 such as keyboard, keypad, mouse, pen, voice input device, touch input device, etc. Output device(s) 1118 such as a display, speakers, printer, etc., also can be included.

A RAN as described herein may comprise any telephony radio network, or any other type of communications network, wireline or wireless, or any combination thereof. The following description sets forth some exemplary telephony radio networks, such as the global system for mobile communications (GSM), and non-limiting operating environments. The below-described operating environments should be considered non-exhaustive, however, and thus the below-described network architectures merely show how smart M2M behavior tracking may be implemented with stationary and non-stationary network structures and architectures in order to do smart M2M behavior tracking. It can be appreciated, however, that smart M2M behavior tracking as described herein may be incorporated with existing and/or future alternative architectures for communication networks as well.

The GSM is one of the most widely utilized wireless access systems in today's fast growing communication environment. The GSM provides circuit-switched data services to subscribers, such as mobile telephone or computer users. The General Packet Radio Service (GPRS), which is an extension to GSM technology, introduces packet switching to GSM networks. The GPRS uses a packet-based wireless communication technology to transfer high and low speed data and signaling in an efficient manner. The GPRS attempts to optimize the use of network and radio resources, thus enabling the cost effective and efficient use of GSM network resources for packet mode applications.

The exemplary GSM/GPRS environment and services described herein also may be extended to 3G services, such as Universal Mobile Telephone System (UMTS), Frequency Division Duplexing (FDD) and Time Division Duplexing (TDD), High Speed Packet Data Access (HSPDA), cdma2000 1 Evolution Data Optimized (EVDO), Code Division Multiple Access-2000 (cdma2000 3), Time Division Synchronous Code Division Multiple Access (TD-SCDMA), Wideband Code Division Multiple Access (WCDMA), Enhanced Data GSM Environment (EDGE), International Mobile Telecommunications-2000 (IMT-2000), Digital Enhanced Cordless Telecommunications (DECT), 4G Services such as Long Term Evolution (LTE), etc., as well as to other network services that become available in time. In this regard, smart M2M behavior tracking may be applied independently of the method of data transport and does not depend on any particular network architecture or underlying protocols.

Figure 12:
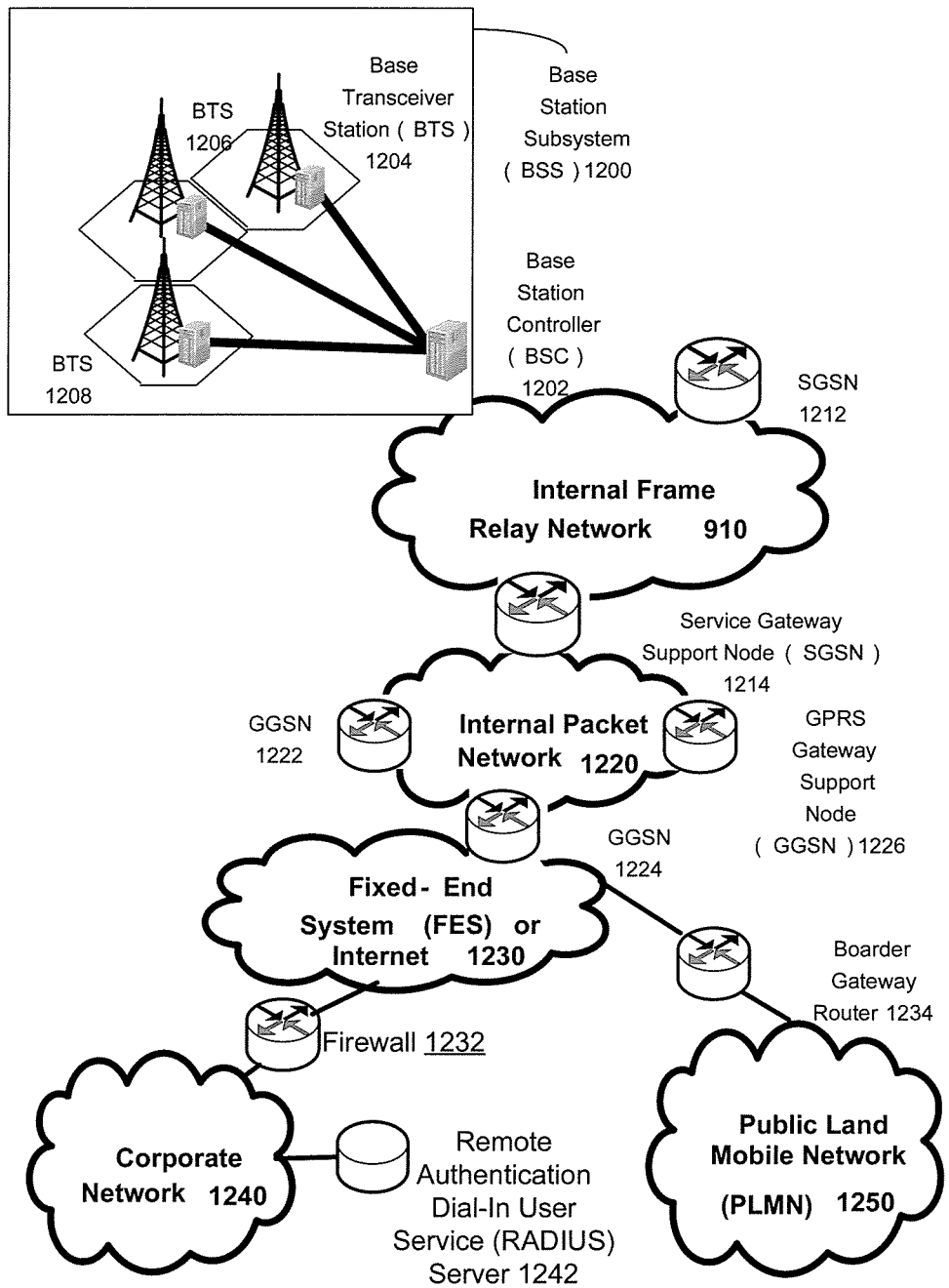
FIG. 12 is a block diagram of an exemplary packet-based mobile cellular network environment, such as a GPRS network, in which one or more disclosed examples may be implemented for smart M2M behavior tracking.

FIG. 12 depicts an overall block diagram of an example packet-based mobile cellular network environment, such as a GPRS network, that may be utilized to facilitate intelligent traffic routing, as described herein. In the example packet-based mobile cellular network environment shown in FIG. 12, there are a plurality of Base Station Subsystems ("BSS") 1200 (only one is shown), each of which comprises a Base Station Controller ("BSC") 1202 serving a plurality of Base Transceiver Stations ("BTS") such as BTSs 1204, 1206, and 1208. BTSs 1204, 1206, 1208, etc. are the access points where users of packet-based mobile devices become connected to the wireless network. In example fashion, the packet traffic originating from user devices is transported via an over-the-air interface to a BTS 1208, and from the BTS 1208 to the BSC 1202. Base station subsystems, such as BSS 1200, are a part of internal frame relay network 1210 that can include Service GPRS Support Nodes ("SGSN") such as SGSN 1212 and 1214. Each SGSN is connected to an internal packet network 820 through which a SGSN 1212, 1214, etc., can route data packets to and from a plurality of gateway GPRS support nodes (GGSN) 1222, 1224, 1226, etc. As illustrated, SGSN 1214 and GGSNs 1222, 1224, and 1226 are part of internal packet network 1220. Gateway GPRS serving nodes 1222, 1224 and 1226 mainly provide an interface to external Internet Protocol ("IP") networks such as Public Land Mobile Network ("PLMN") 1250, corporate intranets 1240, or Fixed-End System ("FES") or the public Internet 1230. As illustrated, subscriber corporate network 1240 may be connected to GGSN 1224 via firewall 1232; and PLMN 1250 is connected to GGSN 1224 via boarder gateway router 1234. The Remote Authentication Dial-In User Service ("RADIUS") server 1242 may be used for caller authentication when a user of a mobile cellular device calls corporate network 1240.

Generally, there may be a several cell sizes in a GSM network, referred to as macro, micro, pico, femto and umbrella cells. The coverage area of each cell is different in different environments. Macro cells can be regarded as cells in which the base station antenna is installed in a mast or a building above average roof top level. Micro cells are cells whose antenna height is under average roof top level. Micro-cells are typically used in urban areas. Pico cells are small cells having a diameter of a few dozen meters. Pico cells are used mainly indoors. Femto cells have the same size as pico cells, but a smaller transport capacity. Femto cells are used indoors, in residential, or small business environments. On the other hand, umbrella cells are used to cover shadowed regions of smaller cells and fill in gaps in coverage between those cells.

Figure 13:
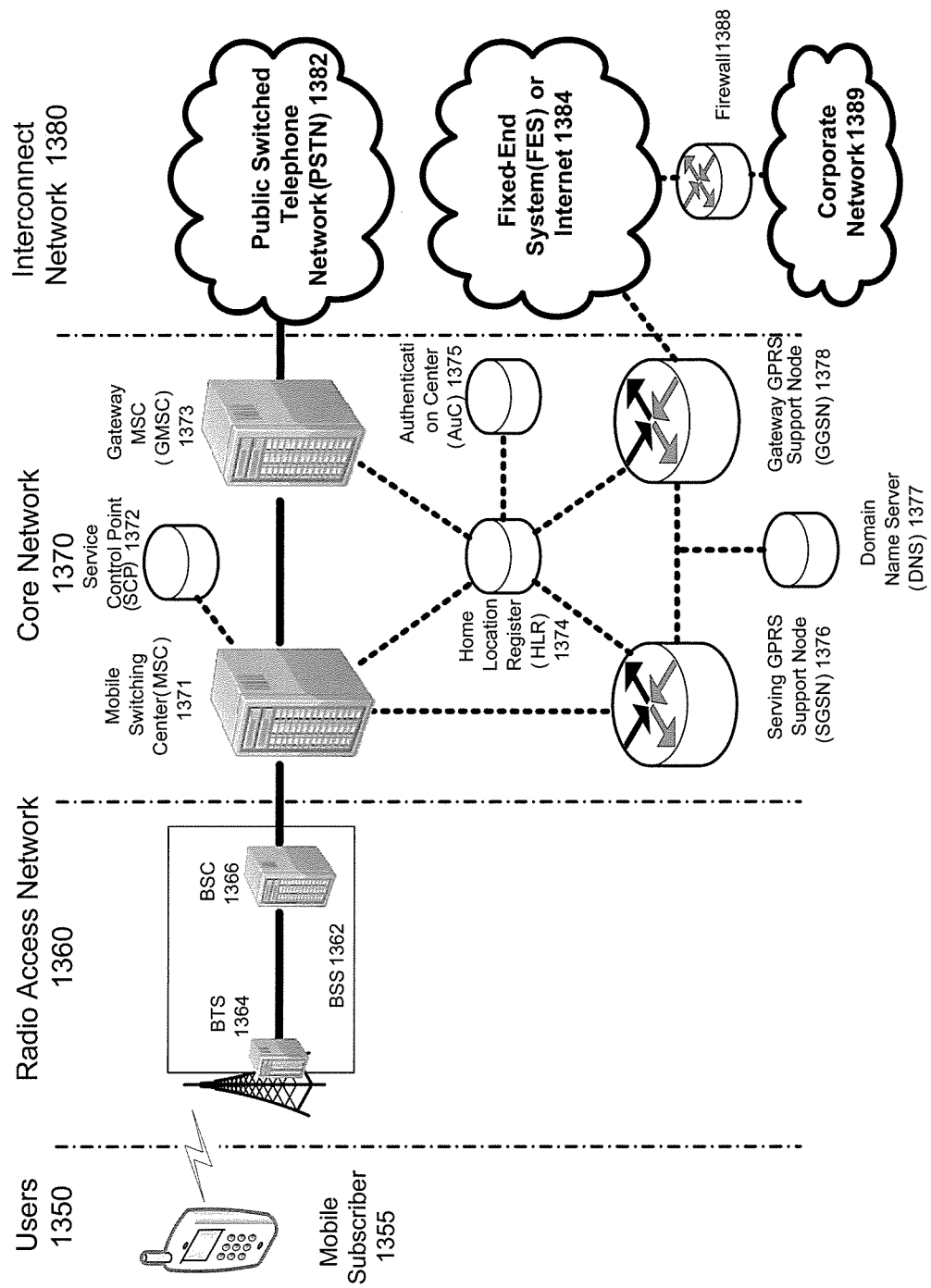
FIG. 13 illustrates a non-limiting exemplary architecture of a typical GPRS network, segmented into four groups, in which one or more disclosed examples may be implemented for smart M2M behavior tracking.

FIG. 13 illustrates an architecture of a typical GPRS network that may be utilized to facilitate intelligent traffic routing, as described herein. The architecture depicted in FIG. 13 may be segmented into four groups: users 1350, radio access network 1360, core network 1370, and interconnect network 1380. Users 1350 comprise a plurality of end users. Note, WTRU 556 is referred to as a mobile subscriber in the description of network shown in FIG. 13. In an aspect, the device depicted as mobile subscriber 1355 comprises a communications device (e.g., communications device 160). Radio access network 1360 comprises a plurality of base station subsystems such as BSSs 1362, which include BTSs 1364 and BSCs 1366. Core network 1370 comprises a host of various network elements. As illustrated in FIG. 13, core network 1370 may comprise Mobile Switching Center ("MSC") 1371, Service Control Point ("SCP") 1372, gateway MSC 1373, SGSN 1376, Home Location Register ("HLR") 1374, Authentication Center ("AuC") 1375, Domain Name Server ("DNS") 1377, and GGSN 1378. Interconnect network 1380 also comprises a host of various networks and other network elements. As illustrated in FIG. 13, interconnect network 1380 comprises Public Switched Telephone Network ("PSTN") 1382, Fixed-End System ("FES") or Internet 984, firewall 1388, and Corporate Network 1389.

A mobile switching center can be connected to a large number of base station controllers. At MSC 1371, for instance, depending on the type of traffic, the traffic may be separated in that voice may be sent to Public Switched Telephone Network ("PSTN") 1382 through Gateway MSC ("GMSC") 1373, and/or data may be sent to SGSN 1376, which then sends the data traffic to GGSN 1378 for further forwarding.

When MSC 1371 receives call traffic, for example, from BSC 1366, it sends a query to a database hosted by SCP 1372. The SCP 1372 processes the request and issues a response to MSC 971 so that it may continue call processing as appropriate.

The HLR 1374 is a centralized database for users to register to the GPRS network. HLR 1374 stores static information about the subscribers such as the International Mobile Subscriber Identity ("IMSI"), subscribed services, and a key for authenticating the subscriber. HLR 1374 also stores dynamic subscriber information such as the current location of the mobile subscriber. Associated with HLR 1374 is AuC 1375. AuC 1375 is a database that contains the algorithms for authenticating subscribers and includes the associated keys for encryption to safeguard the user input for authentication.

In the following, depending on context, the term "mobile subscriber" sometimes refers to the end user and sometimes to the actual portable device, such as a mobile device (such as WTRU 556), used by an end user of the mobile cellular service. When a mobile subscriber turns on his or her mobile device, the mobile device goes through an attach process by which the mobile device attaches to an SGSN of the GPRS network. In FIG. 13, when mobile subscriber 1355 initiates the attach process by turning on the network capabilities of the mobile device, an attach request is sent by mobile subscriber 1355 to SGSN 1376. The SGSN 1376 queries another SGSN, to which mobile subscriber 912 was attached before, for the identity of mobile subscriber 1355. Upon receiving the identity of mobile subscriber 1355 from the other SGSN, SGSN 1376 requests more information from mobile subscriber 1355. This information is used to authenticate mobile subscriber 1355 to SGSN 1376 by HLR 1374. Once verified, SGSN 1376 sends a location update to HLR 1374 indicating the change of location to a new SGSN, in this case SGSN 1376. HLR 1374 notifies the old SGSN, to which mobile subscriber 1355 was attached before, to cancel the location process for mobile subscriber 1355. HLR 1374 then notifies SGSN 1376 that the location update has been performed. At this time, SGSN 1376 sends an Attach Accept message to mobile subscriber 1355, which in turn sends an Attach Complete message to SGSN 1376.

After attaching itself with the network, mobile subscriber 1355 then goes through the authentication process. In the authentication process, SGSN 1376 sends the authentication information to HLR 1374, which sends information back to SGSN 1376 based on the user profile that was part of the user's initial setup. The SGSN 1376 then sends a request for authentication and ciphering to mobile subscriber 912. The mobile subscriber 1355 uses an algorithm to send the user identification (ID) and password to SGSN 1376. The SGSN 1376 uses the same algorithm and compares the result. If a match occurs, SGSN 1376 authenticates mobile subscriber 1355.

Next, the mobile subscriber 1355 establishes a user session with the destination network, corporate network 1389, by going through a Packet Data Protocol ("PDP") activation process. Briefly, in the process, mobile subscriber 1355 requests access to the Access Point Name ("APN"), for example, UPS.com, and SGSN 1376 receives the activation request from mobile subscriber 1355. SGSN 1376 then initiates a Domain Name Service ("DNS") query to learn which GGSN node has access to the UPS.com APN. The DNS query is sent to the DNS server within the core network 1370, such as DNS 1377, which is provisioned to map to one or more GGSN nodes in the core network 1370. Based on the APN, the mapped GGSN 1378 can access the requested corporate network 1389. The SGSN 1376 then sends to GGSN 1378 a Create Packet Data Protocol ("PDP") Context Request message that contains necessary information. The GGSN 1378 sends a Create PDP Context Response message to SGSN 1376, which then sends an Activate PDP Context Accept message to mobile subscriber 1355.

Once activated, data packets of the call made by mobile subscriber 1355 can then go through radio access network 1360, core network 1370, and interconnect network 1380, in a particular fixed-end system or Internet 1384 and firewall 1388, to reach corporate network 1389.

Figure 14:
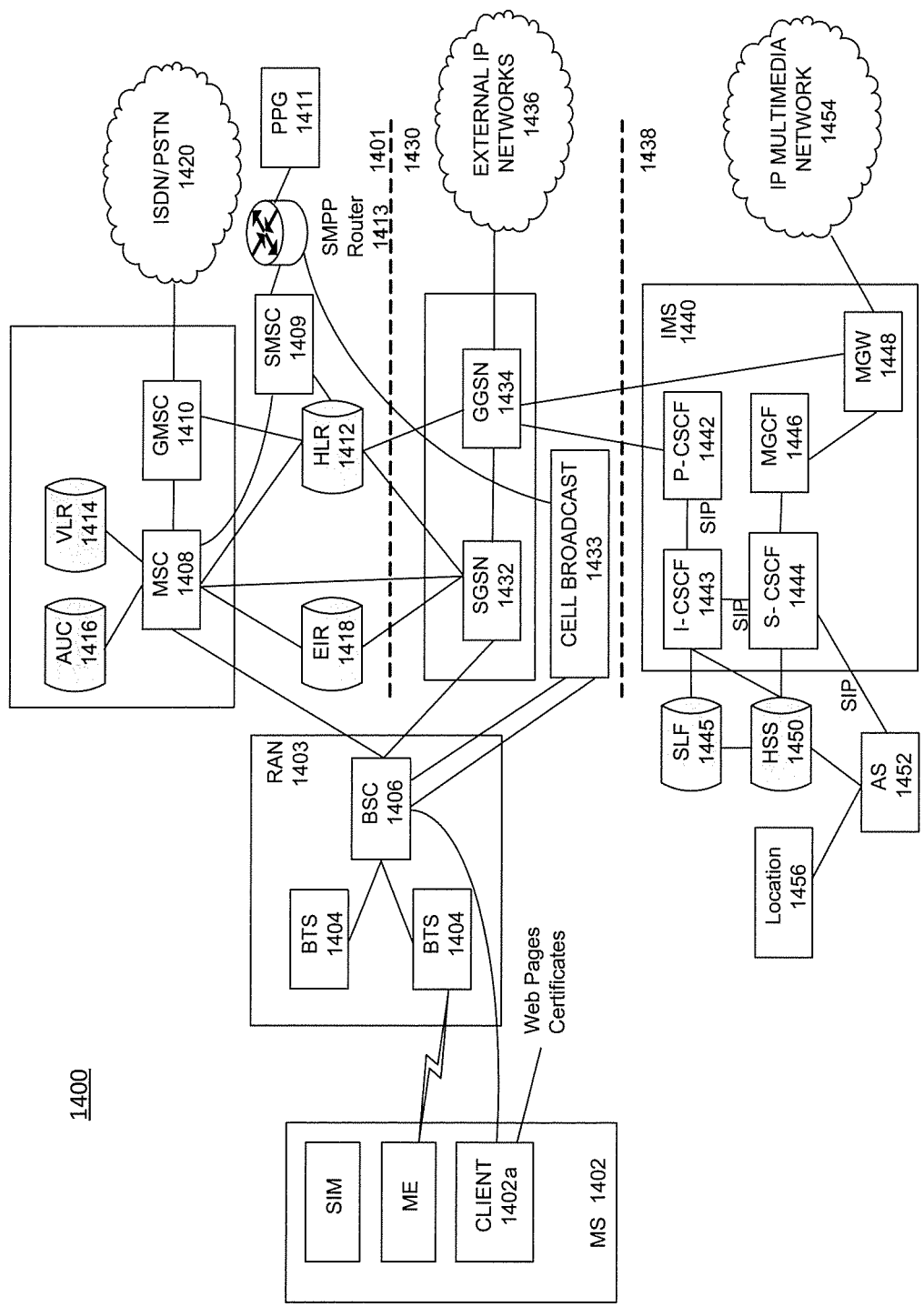
FIG. 14 illustrates a non-limiting alternate block diagram of an exemplary GSM/GPRS/IP multimedia network architecture in which one or more disclosed examples may be implemented for smart M2M behavior tracking.

FIG. 14 illustrates an example block diagram view of a GSM/GPRS/IP multimedia network architecture that may be utilized to facilitate intelligent traffic routing, as described herein. As illustrated, the architecture of FIG. 14 includes a GSM core network 1400, a GPRS network 1430 and an IP multimedia network 1438. The GSM core network 1401 includes a Mobile Station (MS) 1402, at least one Base Transceiver Station (BTS) 1404 and a Base Station Controller (BSC) 1406. The MS 1402 is physical equipment or Mobile Equipment (ME), such as a mobile phone or a laptop computer that is used by mobile subscribers, with a Subscriber identity Module (SIM) or a Universal Integrated Circuit Card (UICC). The SIM or UICC includes an International Mobile Subscriber Identity (IMSI), which is a unique identifier of a subscriber. The BTS 1404 is physical equipment, such as a radio tower, that enables a radio interface to communicate with the MS. Each BTS may serve more than one MS. The BSC 1406 manages radio resources, including the BTS. The BSC may be connected to several BTSs. The BSC and BTS components, in combination, are generally referred to as a base station (BSS) or radio access network (RAN) 1403.

The GSM core network 1401 also includes a Mobile Switching Center (MSC) 1008, a Gateway Mobile Switching Center (GMSC) 1410, a Home Location Register (HLR) 1412, Visitor Location Register (VLR) 1414, an Authentication Center (AuC) 1418, and an Equipment Identity Register (EIR) 1416. The MSC 1408 performs a switching function for the network. The MSC also performs other functions, such as registration, authentication, location updating, handovers, and call routing. The GMSC 1410 provides a gateway between the GSM network and other networks, such as an Integrated Services Digital Network (ISDN) or Public Switched Telephone Networks (PSTNs) 1420. Thus, the GMSC 1410 provides interworking functionality with external networks.

The HLR 1412 is a database that contains administrative information regarding each subscriber registered in a corresponding GSM network. The HLR 1412 also contains the current location of each MS. The VLR 1414 is a database that contains selected administrative information from the HLR 1412. The VLR contains information necessary for call control and provision of subscribed services for each MS currently located in a geographical area controlled by the VLR. The HLR 1412 and the VLR 1414, together with the MSC 1408, provide the call routing and roaming capabilities of GSM. The AuC 1416 provides the parameters needed for authentication and encryption functions. Such parameters allow verification of a subscriber's identity. The EIR 1418 stores security-sensitive information about the mobile equipment.

A Short Message Service Center (SMSC) 1409 allows one-to-one Short Message Service (SMS) messages to be sent to/from the MS 1402. A Push Proxy Gateway (PPG) 1411 is used to "push" (i.e., send without a synchronous request) content to the MS 1002. The PPG 1411 acts as a proxy between wired and wireless networks to facilitate pushing of data to the MS 1402. A Short Message Peer to Peer (SMPP) protocol router 1413 is provided to convert SMS-based SMPP messages to cell broadcast messages. SMPP is a protocol for exchanging SMS messages between SMS peer entities such as short message service centers. The SMPP protocol is often used to allow third parties, e.g., content suppliers such as news organizations, to submit bulk messages.

To gain access to GSM services, such as speech, data, and short message service (SMS), the MS first registers with the network to indicate its current location by performing a location update and IMSI attach procedure. The MS 1402 sends a location update including its current location information to the MSC/VLR, via the BTS 1404 and the BSC 1406. The location information is then sent to the MS's HLR. The HLR is updated with the location information received from the MSC/VLR. The location update also is performed when the MS moves to a new location area. Typically, the location update is periodically performed to update the database as location updating events occur.

The GPRS network 1430 is logically implemented on the GSM core network architecture by introducing two packet-switching network nodes, a serving GPRS support node (SGSN) 1432, a cell broadcast and a Gateway GPRS support node (GGSN) 1434. The SGSN 1432 is at the same hierarchical level as the MSC 1408 in the GSM network. The SGSN controls the connection between the GPRS network and the MS 1402. The SGSN also keeps track of individual MS's locations and security functions and access controls.

A Cell Broadcast Center (CBC) 1433 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

The GGSN 1434 provides a gateway between the GPRS network and a public packet network (PDN) or other IP networks 1436. That is, the GGSN provides interworking functionality with external networks, and sets up a logical link to the MS through the SGSN. When packet-switched data leaves the GPRS network, it is transferred to an external TCP-IP network 1436, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services can be used in parallel. The MS can operate in one of three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time.

A class B MS can attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

A GPRS network 1430 can be designed to operate in three network operation modes (NOM1, NOM2 and NOM3). A network operation mode of a GPRS network is indicated by a parameter in system information messages transmitted within a cell. The system information messages dictates a MS where to listen for paging messages and how to signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS may not receive pages from a circuit switched domain when engaged in a data call, since the MS is receiving data and is not listening to a paging channel. In a NOM3 network, a MS can monitor pages for a circuit switched network while received data and vice versa.

The IP multimedia network 1438 was introduced with 3GPP Release 5, and includes an IP multimedia subsystem (IMS) 1440 to provide rich multimedia services to end users. A representative set of the network entities within the IMS 1440 are a call/session control function (CSCF), a media gateway control function (MGCF) 1446, a media gateway (MGW) 1448, and a master subscriber database, called a home subscriber server (HSS) 1450. The HSS 1450 may be common to the GSM network 1401, the GPRS network 1430 as well as the IP multimedia network 1438.

The IP multimedia system 1440 is built around the call/session control function, of which there are three types: an interrogating CSCF (I-CSCF) 1043, a proxy CSCF (P-CSCF) 1042, and a serving CSCF (S-CSCF) 1444. The P-CSCF 1042 is the MS's first point of contact with the IMS 1440. The P-CSCF 1442 forwards session initiation protocol (SIP) messages received from the MS to an SIP server in a home network (and vice versa) of the MS. The P-CSCF 1442 may also modify an outgoing request according to a set of rules defined by the network operator (for example, address analysis and potential modification).

The I-CSCF 1443, forms an entrance to a home network and hides the inner topology of the home network from other networks and provides flexibility for selecting an S-CSCF. The I-CSCF 1443 may contact a subscriber location function (SLF) 1445 to determine which HSS 1450 to use for the particular subscriber, if multiple HSS's 1450 are present. The S-CSCF 1444 performs the session control services for the MS 1402. This includes routing originating sessions to external networks and routing terminating sessions to visited networks. The S-CSCF 1444 also decides whether an application server (AS) 1452 is required to receive information on an incoming SIP session request to ensure appropriate service handling. This decision is based on information received from the HSS 1450 (or other sources, such as an application server 1452). The AS 1452 also communicates to a location server 1456 (e.g., a Gateway Mobile Location Center (GMLC)) that provides a position (e.g., latitude/longitude coordinates) of the MS 1402.

The HSS 1450 contains a subscriber profile and keeps track of which core network node is currently handling the subscriber. It also supports subscriber authentication and authorization functions (AAA). In networks with more than one HSS 1450, a subscriber location function provides information on the HSS 1450 that contains the profile of a given subscriber.

The MGCF 1446 provides interworking functionality between SIP session control signaling from the IMS 1440 and ISUP/BICC call control signaling from the external GSTN networks (not shown). It also controls the media gateway (MGW) 1448 that provides user-plane interworking functionality (e.g., converting between AMR- and PCM-coded voice). The MGW 1448 also communicates with other IP multimedia networks 1454.

Push to Talk over Cellular (PoC) capable mobile phones register with the wireless network when the phones are in a predefined area (e.g., job site, etc.). When the mobile phones leave the area, they register with the network in their new location as being outside the predefined area. This registration, however, does not indicate the actual physical location of the mobile phones outside the pre-defined area.

Figure 15:
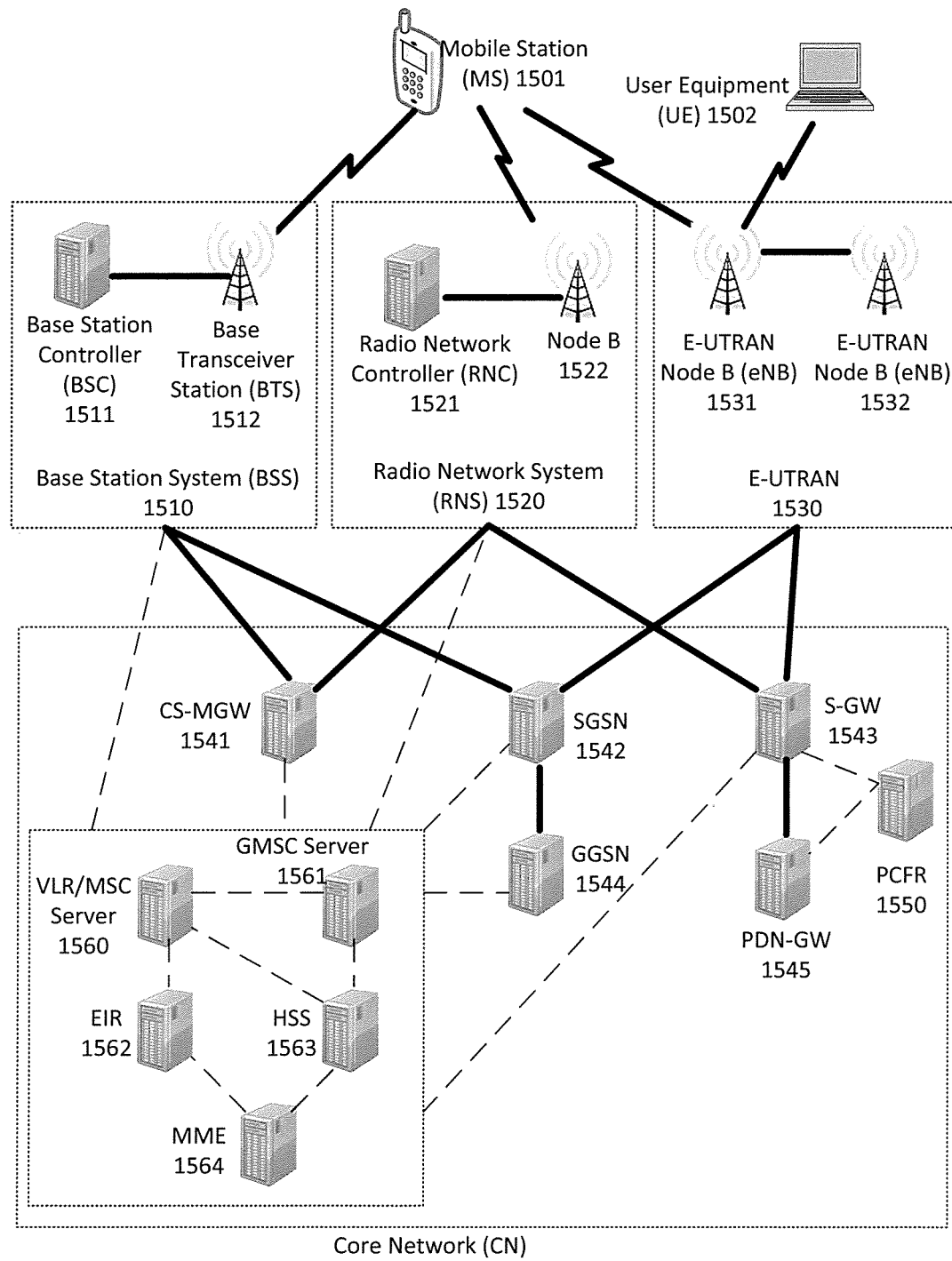
FIG. 15 illustrates a Public Land Mobile Network (PLMN) block diagram view of an exemplary architecture in which one or more disclosed examples may be implemented for smart M2M behavior tracking.

FIG. 15 illustrates a PLMN block diagram view of an exemplary architecture in which smart M2M behavior tracking may be incorporated. Mobile Station (MS) 1501 is the physical equipment used by the PLMN subscriber. In one illustrative example, communications device 40 may serve as Mobile Station 1501. Mobile Station 1501 may be one of, but not limited to, a cellular telephone, a cellular telephone in combination with another electronic device or any other wireless mobile communication device.

Mobile Station 1501 may communicate wirelessly with Base Station System (BSS) 1510. BSS 1510 contains a Base Station Controller (BSC) 1511 and a Base Transceiver Station (BTS) 1512. BSS 1510 may include a single BSC 1511/BTS 1512 pair (Base Station) or a system of BSC/BTS pairs which are part of a larger network. BSS 1510 is responsible for communicating with Mobile Station 1501 and may support one or more cells. BSS 1510 is responsible for handling cellular traffic and signaling between Mobile Station 1501 and Core Network 1540. Typically, BSS 1510 performs functions that include, but are not limited to, digital conversion of speech channels, allocation of channels to mobile devices, paging, and transmission/reception of cellular signals.

Additionally, Mobile Station 1501 may communicate wirelessly with Radio Network System (RNS) 1520. RNS 1520 contains a Radio Network Controller (RNC) 1521 and one or more Node(s) B 1322. RNS 1320 may support one or more cells. RNS 1520 may also include one or more RNC 1521/Node B 1522 pairs or alternatively a single RNC 1521 may manage multiple Nodes B 1522. RNS 1520 is responsible for communicating with Mobile Station 1501 in its geographically defined area. RNC 1521 is responsible for controlling the Node(s) B 1522 that are connected to it and is a control element in a UMTS radio access network. RNC 1521 performs functions such as, but not limited to, load control, packet scheduling, handover control, security functions, as well as controlling Mobile Station 1501's access to the Core Network (CN) 1540.

The evolved UMTS Terrestrial Radio Access Network (E-UTRAN) 1530 is a radio access network that provides wireless data communications for Mobile Station 1501 and User Equipment 1502. E-UTRAN 1530 provides higher data rates than traditional UMTS. It is part of the Long Term Evolution (LTE) upgrade for mobile networks and later releases meet the requirements of the International Mobile Telecommunications (IMT) Advanced and are commonly known as a 4G networks. E-UTRAN 1530 may include of series of logical network components such as E-UTRAN Node B (eNB) 1531 and E-UTRAN Node B (eNB) 1532. E-UTRAN 1530 may contain one or more eNBs. User Equipment 1502 may be any user device capable of connecting to E-UTRAN 1530 including, but not limited to, a personal computer, laptop, mobile device, wireless router, or other device capable of wireless connectivity to E-UTRAN 1530. he improved performance of the E-UTRAN 1530 relative to a typical UMTS network allows for increased bandwidth, spectral efficiency, and functionality including, but not limited to, voice, high-speed applications, large data transfer and IPTV, while still allowing for full mobility.

An exemplary mobile data and communication service that may be implemented in the PLMN architecture described in FIG. 15 is the Enhanced Data rates for GSM Evolution (EDGE). EDGE is an enhancement for GPRS networks that implements an improved signal modulation scheme known as 9-PSK (Phase Shift Keying). By increasing network utilization, EDGE may achieve up to three times faster data rates as compared to a typical GPRS network. EDGE may be implemented on any GSM network capable of hosting a GPRS network, making it an ideal upgrade over GPRS since it may provide increased functionality of existing network resources. Evolved EDGE networks are becoming standardized in later releases of the radio telecommunication standards, which provide for even greater efficiency and peak data rates of up to 1 Mbit/s, while still allowing implementation on existing GPRS-capable network infrastructure.

Typically Mobile Station 1501 may communicate with any or all of BSS 1510, RNS 1520, or E-UTRAN 1530. In an illustrative system, each of BSS 1510, RNS 1520, and E-UTRAN 1530 may provide Mobile Station 1501 with access to Core Network 1540. The Core Network 1540 may include of a series of devices that route data and communications between end users. Core Network 1540 may provide network service functions to users in the Circuit Switched (CS) domain, the Packet Switched (PS) domain or both. The CS domain refers to connections in which dedicated network resources are allocated at the time of connection establishment and then released when the connection is terminated. The PS domain refers to communications and data transfers that make use of autonomous groupings of bits called packets. Each packet may be routed, manipulated, processed or handled independently of all other packets in the PS domain and does not require dedicated network resources.

The Circuit Switched—Media Gateway Function (CS-MGW) 1541 is part of Core Network 1540, and interacts with Visitor Location Register (VLR) and Mobile-Services Switching Center (MSC) Server 1560 and Gateway MSC Server 1561 in order to facilitate Core Network 1540 resource control in the CS domain. Functions of CS-MGW 1541 include, but are not limited to, media conversion, bearer control, payload processing and other mobile network processing such as handover or anchoring. CS-MGW 1540 may receive connections to Mobile Station 1501 through BSS 1510, RNS 1520 or both.

Serving GPRS Support Node (SGSN) 1542 stores subscriber data regarding Mobile Station 1501 in order to facilitate network functionality. SGSN 1542 may store subscription information such as, but not limited to, the International Mobile Subscriber Identity (IMSI), temporary identities, or Packet Data Protocol (PDP) addresses. SGSN 1542 may also store location information such as, but not limited to, the Gateway GPRS Support Node (GGSN) 1544 address for each GGSN where an active PDP exists. GGSN 1544 may implement a location register function to store subscriber data it receives from SGSN 1542 such as subscription or location information.

Serving Gateway (S-GW) 1543 is an interface which provides connectivity between E-UTRAN 1530 and Core Network 1540. Functions of S-GW 1543 include, but are not limited to, packet routing, packet forwarding, transport level packet processing, event reporting to Policy and Charging Rules Function (PCRF) 1550, and mobility anchoring for inter-network mobility. PCRF 1550 uses information gathered from S-GW 1543, as well as other sources, to make applicable policy and charging decisions related to data flows, network resources and other network administration functions. Packet Data Network Gateway (PDN-GW) 1545 may provide user-to-services connectivity functionality including, but not limited to, network-wide mobility anchoring, bearer session anchoring and control, and IP address allocation for PS domain connections.

Home Subscriber Server (HSS) 1563 is a database for user information, and stores subscription data regarding Mobile Station 1501 or User Equipment 1502 for handling calls or data sessions. Networks may contain one HSS 1563 or more if additional resources are required. Exemplary data stored by HSS 1563 include, but is not limited to, user identification, numbering and addressing information, security information, or location information. HSS 1563 may also provide call or session establishment procedures in both the PS and CS domains.

The VLR/MSC Server 1560 provides user location functionality. When Mobile Station 1301 enters a new network location, it begins a registration procedure. A MSC Server for that location transfers the location information to the VLR for the area. A VLR and MSC Server may be located in the same computing environment, as is shown by VLR/MSC Server 1560, or alternatively may be located in separate computing environments. A VLR may contain, but is not limited to, user information such as the IMSI, the Temporary Mobile Station Identity (TMSI), the Local Mobile Station Identity (LMSI), the last known location of the mobile station, or the SGSN where the mobile station was previously registered. The MSC server may contain information such as, but not limited to, procedures for Mobile Station 1501 registration or procedures for handover of Mobile Station 1501 to a different section of the Core Network 1540. GMSC Server 1561 may serve as a connection to alternate GMSC Servers for other mobile stations in larger networks.

Equipment Identity Register (EIR) 1562 is a logical element which may store the International Mobile Equipment Identities (IMEI) for Mobile Station 1501. In a typical example, user equipment may be classified as either "white listed" or "black listed" depending on its status in the network. In one example, if Mobile Station 1501 is stolen and put to use by an unauthorized user, it may be registered as "black listed" in EIR 1562, preventing its use on the network. Mobility Management Entity (MME) 1564 is a control node which may track Mobile Station 1501 or User Equipment 1502 if the devices are idle. Additional functionality may include the ability of MME 1564 to contact an idle Mobile Station 1501 or User Equipment 1502 if retransmission of a previous session is required.

While example embodiments of smart M2M behavior tracking have been described in connection with various computing devices/processors, the underlying concepts may be applied to any computing device, processor, or system capable of facilitating intelligent traffic routing. The various techniques described herein may be implemented in connection with hardware or software or, where appropriate, with a combination of both. Thus, the methods and apparatuses of smart M2M behavior tracking, or certain aspects or portions thereof, may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes an apparatus for intelligent traffic routing, on user equipment as described herein. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. The language can be a compiled or interpreted language, and combined with hardware implementations.

The methods and apparatuses associated with smart M2M behavior tracking as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for implementing intelligent traffic routing as described herein. When implemented on a general-purpose processor, the program code combines with the processor to provide a unique apparatus that operates to invoke the functionality of intelligent traffic routing as described herein.

While smart M2M behavior tracking has been described in connection with the various embodiments of the various figures, it is to be understood that other similar embodiments may be used or modifications and additions may be made to the described embodiments of smart M2M behavior tracking without deviating therefrom. For example, one skilled in the art will recognize that smart M2M behavior tracking as described in the instant application may apply to any environment, whether wired or wireless, and may be applied to any number of such devices connected via a communications network and interacting across the network. Therefore, smart M2M behavior tracking as described herein should not be limited to any single embodiment, but rather should be construed in breadth and scope in accordance with the appended claims.

What is claimed:
1. An apparatus comprising:
  a processor; and
  memory coupled to the processor, the memory comprising executable instructions that when executed by the processor cause the processor to effectuate operations comprising:
    designating a first region of a first plurality of regions as being associated with a first product region, wherein the first region is defined by a first plurality of short-range communication devices associated with a first venue comprising the first product region;
    designating a second region of a second plurality of regions, wherein the second region is defined by a second plurality of short-range communication devices associated with a second venue comprising a second product region sharing a same product designation as the first product region;
specifying a proximity for each of the first plurality of short-range communication devices associated with the first venue and for each of the second plurality of short-range communication devices associated with the second venue; and
responsive to receiving a trigger generated in response to a mobile device entering the proximity of a short-range communication device of the second plurality of short-range communication devices within the second venue, providing information pertaining to a product to the mobile device based on historical location information associated with the mobile device pertaining to operation of the mobile device within the first product region of the first venue and historical location information associated with the mobile device pertaining to operation of the mobile device within a third product region of a third venue.

2. The apparatus of claim 1, wherein the proximity is specified based on a common scheme, wherein the scheme is applied to the first plurality of short-range communication devices.

3. The apparatus of claim 1, wherein the proximity is specified based on a common scheme, wherein the scheme is applied to the first product region.

4. The apparatus of claim 1, the operations further comprising designating a third region of a third plurality of regions, wherein the third region is defined by a third plurality of short-range communication devices associated with the third venue comprising the third product region sharing a same product designation as the first product region.

5. The apparatus of claim 1, the operations further comprising determining that the mobile device comprises a registered mobile device prior to providing information to the mobile device.

6. The apparatus of claim 1, wherein the information is provided to the mobile device in a format based on a user preference associated with a user profile, wherein the user profile is associated with the mobile device.

7. The apparatus of claim 1, wherein the historical location information comprises location information and location behavior data for a plurality of mobile devices within the second region.

8. The apparatus of claim 1, wherein the historical location information comprises location information and location behavior data for a plurality of mobile devices within the first region.

9. A method comprising:
designating a first region of a first plurality of regions as associated with a first product region, wherein the first region is defined by a first plurality of short-range communication devices associated with a first venue comprising the first product region;
designating a second region of a second plurality of regions, wherein the second product region is defined by a second plurality of short-range communication devices associated with a second venue comprising a second product region sharing a same product designation as the first product region;
specifying a proximity for each of the first plurality of short-range communication devices associated with the first venue and for each of the second plurality of short-range communication devices associated with the second venue; and
responsive to receiving a trigger generated in response to a mobile device entering the proximity of a short-range communication device of the second plurality of short-range communication devices within the second venue, providing information pertaining to a product to the mobile device based on historical location information associated with the mobile device pertaining to operation of the mobile device within the first product region of the first venue and historical location information associated with the mobile device pertaining to operation of the mobile device within a third product region of a third venue.

10. The method of claim 9, wherein the proximity is specified based on a common scheme, wherein the scheme is applied to the first plurality of short-range communication devices.

11. The method of claim 9, wherein the proximity is specified based on a common scheme, wherein the scheme is applied to the first product region.

12. The method of claim 9 further comprising designating a third region of a third plurality of regions, wherein the third region is defined by a third plurality of short-range communication devices associated with the third venue comprising the third product region sharing a same product designation as the first product region.

13. The method of claim 9, further comprising determining that the mobile device comprises a registered mobile device prior to providing information to the mobile device.

14. The method of claim 9, wherein the historical location information comprises location information and location behavior data for a plurality of mobile devices within the second region.

15. The method of claim 9, wherein the historical location information comprises location information and location behavior data for a plurality of mobile devices within the first region.

16. A non-transitory computer-readable storage medium comprising executable instructions that when executed by a processor cause the processor to effectuate operations comprising:
designating a first region of a first plurality of regions as associated with a first product region, wherein the first region is defined by a first plurality of short-range communication devices associated with a first venue comprising the first product region;
designating a second region of a second plurality of regions, wherein the second product region is defined by a second plurality of short-range communication devices associated with a second venue comprising a second product region sharing a same product designation as the first product region;
specifying a proximity for each of the first plurality of short-range communication devices associated with the first venue and for each of the second plurality of short-range communication devices associated with the second venue; and
responsive to receiving a trigger generated in response to a mobile device entering the proximity of a short-range communication device of the second plurality of short-range communication devices within the second venue, providing information pertaining to a product to the mobile device based on historical location information associated with the mobile device pertaining to operation of the mobile device within the first product region of the first venue and historical location information associated with the mobile device pertaining to operation of the mobile device within a third product region of a third venue.

17. The non-transitory computer-readable storage medium of claim 16, wherein the proximity is specified based on a common scheme, wherein the scheme is applied to the first plurality of short-range communication devices.

18. The non-transitory computer-readable storage medium of claim 16, wherein the proximity is specified based on a common scheme, wherein the scheme is applied to the first product region.

19. The non-transitory computer-readable storage medium of claim 16 further comprising designating a third region of a third plurality of regions, wherein the third region is defined by a third plurality of short-range communication devices associated with the third venue comprising the third product region sharing a same product designation as the first product region.

20. The non-transitory computer-readable storage medium of claim 16, wherein the historical location information comprises location information and location behavior data for a plurality of mobile devices within the first region.

* * * * *